US011378521B2

(12) United States Patent
Kasai et al.

(10) Patent No.: US 11,378,521 B2
(45) Date of Patent: Jul. 5, 2022

(54) OPTICAL CONDITION DETERMINATION SYSTEM AND OPTICAL CONDITION DETERMINATION METHOD

(71) Applicant: Hitachi, Ltd., Tokyo (JP)

(72) Inventors: Hiroaki Kasai, Tokyo (JP); Keiko Oka, Tokyo (JP); Hisae Shibuya, Tokyo (JP); Akio Yazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 82 days.

(21) Appl. No.: 16/923,312

(22) Filed: Jul. 8, 2020

(65) Prior Publication Data
US 2021/0072162 A1   Mar. 11, 2021

(30) Foreign Application Priority Data
Sep. 9, 2019 (JP) .............................. JP2019-163644

(51) Int. Cl.
*G01N 21/00* (2006.01)
*G01N 21/88* (2006.01)
(Continued)

(52) U.S. Cl.
CPC ......... *G01N 21/8806* (2013.01); *G06T 7/001* (2013.01); *G01N 21/9501* (2013.01); *G06T 2207/30148* (2013.01)

(58) Field of Classification Search
CPC .............. G01N 21/9501; G01N 21/94; G01N 21/8806; G01N 21/956; G01N 21/95607
(Continued)

(56) References Cited

U.S. PATENT DOCUMENTS 7,098,455 B2   8/2006   Shinada et al.
9,733,194 B2   8/2017   Otani et al.
(Continued)

FOREIGN PATENT DOCUMENTS

JP   2011106974 A   6/2011
JP    201620867 A   2/2016

OTHER PUBLICATIONS

Takayoshi Fujii et al. "Development of optical simulat iontool for defect inspection", SPIE Advanced Lithography, Proc SPIE vol. 7272, Mar. 2009, p. 1-9.
(Continued)

*Primary Examiner* — Md M Rahman
(74) *Attorney, Agent, or Firm* — Miles & Stockbridge, P.C.

(57) ABSTRACT

An optical condition determination system includes a simulation execution unit that performs an optical simulation on a surface texture model that models a surface texture of a target object of the appearance inspection, and a defect model that models a defect of the target object, under a plurality of optical conditions to generate a surface texture image and a defect image, an image synthesizing unit that synthesizes the surface texture image and the defect image generated by an optical simulation under the same optical condition to generate a synthetic image, an evaluation value calculating unit that calculates an evaluation value representing easiness of detecting the defect in the synthetic image, a correlation analysis unit that analyzes a correlation between an optical condition and the evaluation value corresponding to the synthetic image, and an optimum condition searching unit that searches for the optical condition suitable for the appearance inspection based on an analysis result of the correlation.

10 Claims, 17 Drawing Sheets

(51) Int. Cl.
*G06T 7/00* (2017.01)
*G01N 21/95* (2006.01)

(58) Field of Classification Search
USPC ...................................................... 356/237.2
See application file for complete search history.

(56) References Cited

U.S. PATENT DOCUMENTS

| | | |
|---|---|---|
| 2003/0231297 A1 | 12/2003 | Endo |
| 2007/0121106 A1 | 5/2007 | Shibata |
| 2008/0112644 A1* | 5/2008 | Yokohata ........... H04N 5/23248 382/278 |
| 2009/0279081 A1 | 11/2009 | Urano |
| 2012/0050729 A1 | 3/2012 | Mitomo |
| 2012/0274931 A1 | 11/2012 | Otani et al. |
| 2013/0002849 A1* | 1/2013 | Sakai ...................... G06T 7/001 382/141 |
| 2013/0114078 A1 | 5/2013 | Honda |
| 2013/0148116 A1 | 6/2013 | Tanaka |
| 2013/0148859 A1 | 6/2013 | Inoue |
| 2013/0329039 A1 | 12/2013 | Sakai |
| 2016/0018340 A1 | 1/2016 | Otani et al. |

OTHER PUBLICATIONS

Harukawa Ryota et al. Defect analysis methodology for contact hole grapho epitaxy DSA, Proceedings of SPIE, IEEE, US, vol. 9050, Apr. 2014, pp. 1-6.
Search Report dated Dec. 8, 2020 in corresponding European Application No. 20 183 858.8.

* cited by examiner

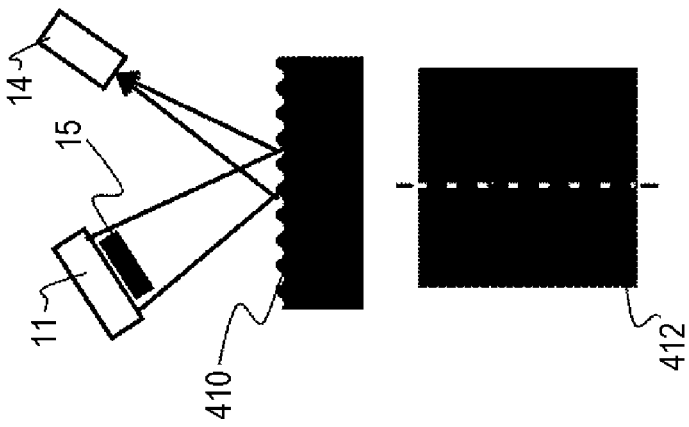
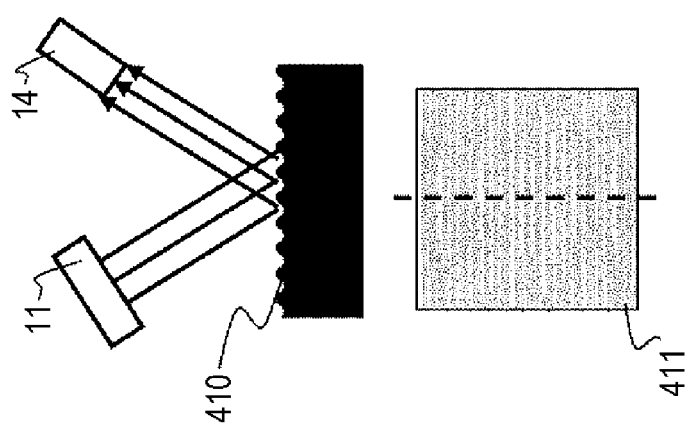
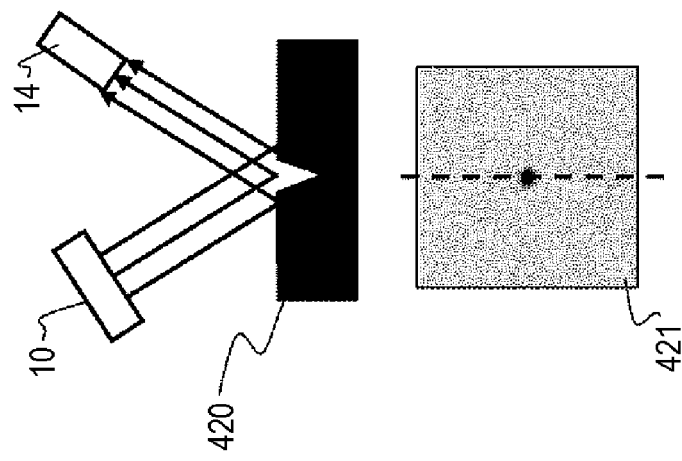

OPTICAL CONDITION DETERMINATION SYSTEM AND OPTICAL CONDITION DETERMINATION METHOD

BACKGROUND OF THE INVENTION

1. Field of the Invention

The present invention relates to an optical condition determination system and an optical condition determination method.

2. Description of the Related Art

In appearance inspection for inspecting the appearance of a target object based on an image obtained by illuminating the target object, it is necessary to optimize optical conditions of the illumination and the camera.

For example, JP 2016-20867 A discloses that "a defect observation method includes a light acquisition step for irradiating a sample under a plurality of different optical conditions obtained by changing only at least one of an irradiation condition, a material condition, and a detection condition to detect a plurality of beams of light from the sample, a signal acquisition step for acquiring a plurality of signals based on the plurality of beams of detected light, and a processing step for determining a defect and a noise by a waveform feature amount or an image feature amount or value feature amount created using the plurality of signals to obtain coordinates of the defect".

SUMMARY OF THE INVENTION

JP 2016-20867 A mentioned above describes that an optical simulation may be used in determining the optical condition. However, the optical simulation and the actual measurement may deviate from each other, and in that case, an optimum optical condition cannot be derived.

The invention has been made in view of such a situation, and an object thereof is to make it possible to derive optimum optical condition for appearance inspection.

The present application includes a plurality of means for solving at least a part of the above problems, and examples thereof are as follows.

In order to solve the above problems, an optical condition determination system according to one aspect of the invention determines an optical condition to be applied to an appearance inspection. The optical condition determination system includes a simulation execution unit that performs an optical simulation on a surface texture model that models a surface texture of a target object of the appearance inspection, and a defect model that models a defect of the target object, under a plurality of optical conditions to generate a surface texture image and a defect image, an image synthesizing unit that synthesizes the surface texture image and the defect image generated by an optical simulation under the same optical condition to generate a synthetic image, an evaluation value calculating unit that calculates an evaluation value representing easiness of detecting the defect in the synthetic image, a correlation analysis unit that analyzes a correlation between an optical condition and the evaluation value corresponding to the synthetic image, and an optimum condition searching unit that searches for the optical condition suitable for the appearance inspection based on an analysis result of the correlation.

According to one aspect of the invention, it is possible to derive an optimum optical condition for appearance inspection.

Objects, configurations, and effects besides the above description will be apparent through the explanation on the following embodiments.

BRIEF DESCRIPTION OF THE DRAWINGS

FIGS. 5A to 5C are diagrams illustrating examples of an optical simulation model, in which FIG. 5A illustrates an example of an optical simulation model and a defect image using the defect model, FIG. 5B illustrates an example of an optical simulation model and a surface texture image using the surface texture model, and FIG. 5C illustrates an example of an optical simulation model and a background image using the surface texture model;

FIGS. 7A and 7B are diagrams for explaining a method for generating a synthetic image, in which FIG. 7A illustrates an example of the synthetic image, and FIG. 7B illustrates an example of the light intensity of the synthetic image;

DESCRIPTION OF THE PREFERRED EMBODIMENTS

Figure 1:
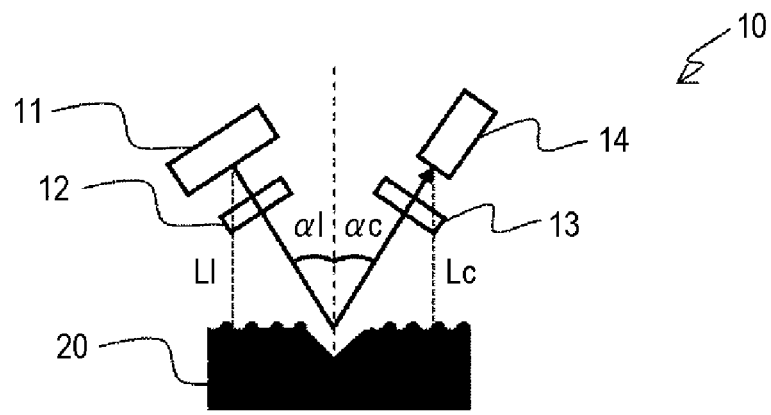
FIG. 1 is a diagram illustrating a configuration example of an appearance inspection device.

Hereinafter, an embodiment of the invention will be described on the basis of the drawings. Further, the same members in the drawings for describing the embodiments will be attached with the same symbol as a principle, and the redundant description will be omitted. Further, in the following embodiments, it is needless to say that the components (including element steps and the like) are not necessarily essential unless otherwise specified and considered to be essential in principle. Also, when referring to "configured by A", "formed by A", "having A", and "including A", except for the case where it is explicitly stated that only the element is included, it needless to say that other elements are excluded. Similarly, in the following embodiments, when referring to shapes, positional relationships, etc. of components etc., substantially the shapes thereof and similar shapes are included unless otherwise specified and considered to be essential in principle.

<Configuration Example of Appearance Inspection Device 10>

FIG. 1 illustrates a configuration example of an appearance inspection device 10.

The appearance inspection device 10 captures an image of a target object 20 to be subjected to an appearance inspection under predetermined optical conditions and generates a light intensity distribution image of the target object 20.

The appearance inspection device 10 includes an illumination 11, polarizers 12 and 13, and a camera 14. The illumination 11 is configured by a lighting device such as a light emitting diode (LED) light bulb, and irradiates the target object 20 with light. The polarizer 12 is disposed between the illumination 11 and the target object 20, and adjusts the polarization of the light emitted from the illumination 11. The polarizer 13 is disposed between the target object 20 and the camera 14, and adjusts the polarization of the light reflected by the target object 20. One or both of the polarizers 12 and 13 may be omitted.

The camera 14 includes an image sensor such as a complementary metal oxide semiconductor (CMOS) image sensor, and performs photoelectric conversion according to the light which is irradiated from the illumination 11, passes through the polarizer 12 and is reflected on the target object 20, and passes through the polarizer 13 and is made incident, so that a light intensity distribution image of the target object 20 is generated. The generated light intensity distribution image of the target object 20 is used, for example, in the information processing device 200 (FIG. 2) for appearance inspection of the target object 20, that is, for determining the presence/absence of a defect on the surface of the target object 20.

Here, the optical conditions include at least one of type, shape, wavelength, position (a distance Ll from the target 20), and angle αl (an angle perpendicular to the surface of the target 20) of the illumination 11, the presence/absence of the polarizer 12, the presence/absence of the polarizer 13, the sensitivity wavelength of the camera 14, the position (a distance Lc from the target object 20), and an angle αc (an angle perpendicular to the surface of the target object 20).

The embodiment described below determines the optimum optical condition in the appearance inspection device 10.

<Configuration Example of Optical Condition Determination System 100 according to Embodiment of Invention>

Figure 2:
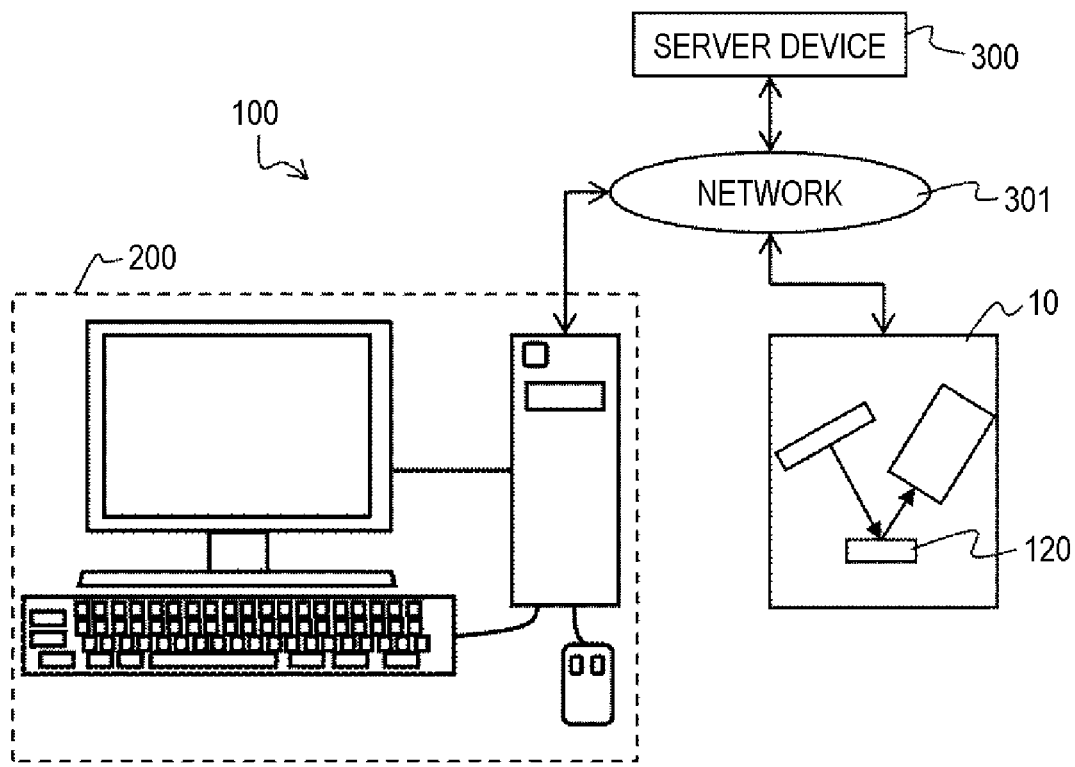
FIG. 2 is a diagram illustrating a configuration example of an optical condition determination system according to an embodiment of the invention.

Next, FIG. 2 illustrates a configuration example of the optical condition determination system 100 according to an embodiment of the invention.

The optical condition determination system 100 includes an appearance inspection device 10, an information processing device 200, and a server device 300.

The information processing device 200 includes a general computer such as a personal computer. The information processing device 200 is connected to the appearance inspection device 10 via the network 301, controls the imaging of a non-defect sample 120 as a target object of the appearance inspection device 10, and the light intensity distribution image of the non-defect sample 120 captured by the appearance inspection device 10 is acquired. Further, the information processing device 200 and the appearance inspection device 10 may be directly connected without passing through the network 301.

Further, the information processing device 200 communicates predetermined information with the server device 300 via the network 301 represented by the Internet. The server device 300 is configured by a general computer such as a server computer. In the server device 300, some or all of functional blocks and a database (DB) included in the information processing device 200 described later can be disposed. When the DB is disposed in the server device 300, the DB disposed in the server device 300 can be shared by a plurality of different information processing devices 200.

<First Configuration Example of Information Processing Device 200>

Figure 3:
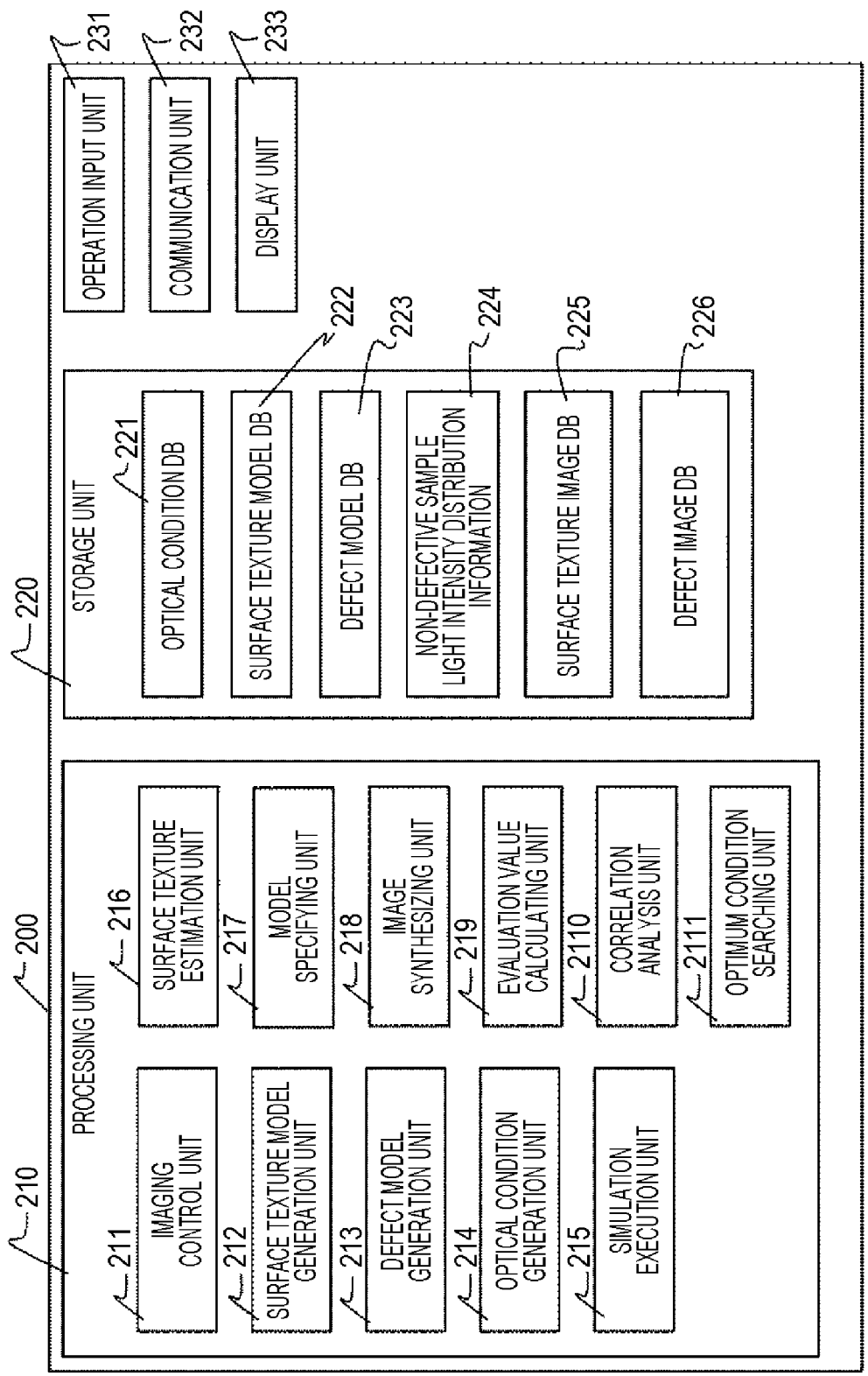
FIG. 3 is a diagram illustrating a first configuration example of an information processing device in the optical condition determination system.

Next, FIG. 3 illustrates a first configuration example of the information processing device 200. The first configuration example includes a processing unit 210, a storage unit 220, an operation input unit 231, a communication unit 232, and a display unit 233.

The processing unit 210 corresponds to a Central Processing Unit (CPU) of a computer and controls the entire information processing device 200. The processing unit 210 also causes the display unit 233 to display an operation screen 1200 (FIG. 10) and the like. Further, the processing unit 210 executes a predetermined program to realize the functional blocks of an imaging control unit 211, a surface texture model generation unit 212, a defect model generation unit 213, an optical condition generation unit 214, a simulation execution unit 215, and a surface texture estimation unit 216, the model specifying unit 217, an image synthesizing unit 218, an evaluation value calculating unit 219, a correlation analysis unit 2110, and an optimum condition searching unit 2111.

The imaging control unit 211 controls imaging of the target object 20 by the appearance inspection device 10. Further, the imaging control unit 211 acquires the light intensity distribution image (hereinafter, referred to as an actual measurement image) of the non-defect sample 120 obtained by the appearance inspection device 10 imaging the non-defect sample 120, and non-defect sample light intensity distribution information including the optical condition at the time of imaging. Then, the imaging control unit 211 causes the storage unit 220 to store the acquired non-defect sample light intensity distribution information.

The method for acquiring the non-defect sample light intensity distribution information from the appearance inspection device 10 may be performed by communication via the network 301. A semiconductor memory that is detachable from both the appearance inspection device 10 and the information processing device 200 may be used to record the non-defect sample light intensity distribution information in the semiconductor memory by the appearance inspection device 10. The information processing device 200 may read the information from the semiconductor memory.

The surface texture model generation unit 212 generates a plurality of surface texture models 410 (FIG. 4) and stores information regarding the generated surface texture models 410 in a surface texture model DB 222 of the storage unit 220. The defect model generation unit 213 generates a plurality of defect models 420 (FIG. 4) and stores information regarding the generated defect models 420 in a defect model DB 223 of the storage unit 220. Details of the surface texture model 410 and the defect model 420 will be described later with reference to FIG. 4.

The optical condition generation unit 214 generates a plurality of optical conditions to be set for the simulation execution unit 215 and stores the generated plurality of optical conditions in an optical condition DB 221 of the storage unit 220. Further, the optical condition generation unit 214 specifies an optical condition that falls within the optical condition range input by the user.

The simulation execution unit 215 performs an optical simulation similar to the imaging of the appearance inspection device 10 on each of the surface texture model 410 and the defect model 420 under the plurality of optical conditions, so that the light intensity distribution image (hereinafter, referred to as a surface texture image 411 (FIGS. 5A to 5C)) of the surface texture model 410 and the light intensity distribution image of the defect model 420 (hereinafter, referred to as a defect image 421 (FIGS. 5A to 5C)) are generated. The simulation execution unit 215 also stores the generated surface texture image 411 in a surface texture image DB 225 of the storage unit 220, and stores the generated defect image 421 in a defect image DB 226 of the storage unit 220. Details of the optical simulation will be described later with reference to FIG. 5.

The surface texture estimation unit 216 estimates the surface texture of the non-defect sample 120. In other words, the surface texture estimation unit 216 specifies the surface texture model 410 similar to the surface texture of the non-defect sample 120. Further, the surface texture estimation unit 216 reads out a plurality of surface texture images 411 generated by the optical simulation for the specified surface texture model 410 from the surface texture image DB 225, and outputs the images to the image synthesizing unit 218. Details of the method for estimating the surface texture of the non-defect sample 120 by the surface texture estimation unit 216 will be described later with reference to FIG. 6.

The model specifying unit 217 refers to the defect model DB 223 and specifies the defect model 420 that matches the defect information (defect type and parameter) input by the user. Further, the model specifying unit 217 reads out a plurality of defect images 421 generated by optical simulation for the identified defect model 420 from the defect image DB 226 and outputs the images to the image synthesizing unit 218.

The image synthesizing unit 218 synthesizes the surface texture image 411 and the defect image 421 generated by the optical simulation under the same optical condition within the optical condition range set by the user to generate a synthetic image. Details of the method for generating the synthetic image will be described later with reference to FIGS. 7A and 7B.

The evaluation value calculating unit 219 calculates Signal/Noise (S/N) as an evaluation value indicating the easiness of detecting a defect in the synthetic image. A value other than S/N may be calculated as the evaluation value. A method for calculating the S/N of the synthetic image will be described later with reference to FIG. 8.

The correlation analysis unit 2110 analyzes the correlation between the optical condition corresponding to the synthetic image and the S/N. The optimum condition searching unit 2111 searches for the optimum optical condition satisfying the optimization condition selected by the user (for example, S/N maximum, S/N stability (the gradient of S/N is gentle) etc.) based on the correlation between the analyzed optical condition and the S/N.

The storage unit 220 corresponds to a memory or a storage included in the computer. The storage unit 220 stores the optical condition DB 221, the surface texture model DB 222, the defect model DB 223, non-defect sample light intensity distribution information 224, the surface texture image DB 225, and the defect image DB 226. Details of each DB will be described later with reference to FIG. 9.

Further, the storage unit 220 is used as a work area of each functional block included in the processing unit 210.

The operation input unit 231 corresponds to a keyboard, a mouse, and the like included in the computer, receives an input from the user, and outputs the input to the processing unit 210. The communication unit 232 corresponds to a communication module included in the computer, and communicates with the server device 300 and the like via the network 301. The display unit 233 corresponds to a display included in the computer and displays the operation screen 1200 (FIG. 10) and the like.

Further, some or all of the functional blocks of the processing unit 210 and some or all of the DBs stored in the storage unit 220 may be disposed in the server device 300.

Figure 4:
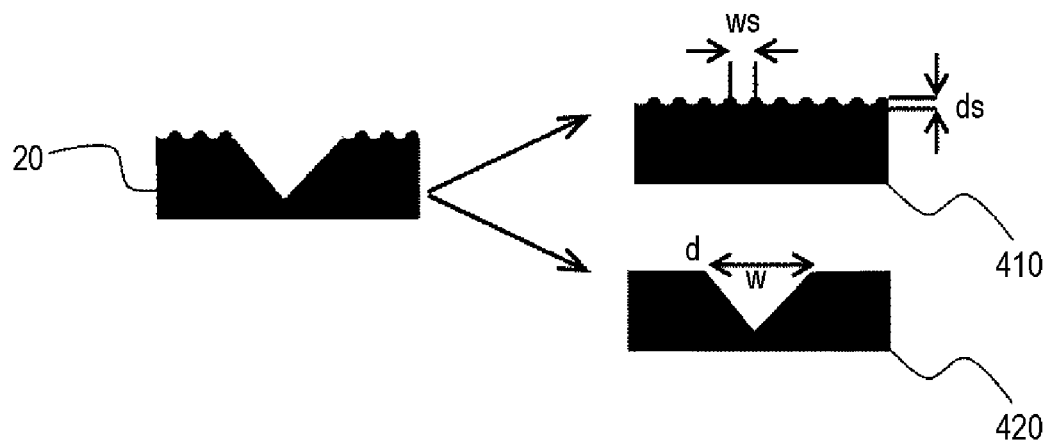
FIG. 4 is a diagram illustrating an example of a surface texture model and a defect model.

Next, FIG. 4 illustrates an example of the surface texture model 410 and the defect model 420. In the first configuration example of the information processing device 200, the target object 20 whose surface texture is not flat and may have a defect is modeled separately into the surface texture model 410 having no defect and reflecting only the surface texture of the target object 20, and the defect model 420 reflecting only the defect of the target object 20.

In the surface texture model 410 generated by the surface texture model generation unit 212, the surface texture is represented by a one-dimensional Sin wave, and a cycle ws, the amplitude ds, the refractive index, etc. are used as parameters. The surface texture model generation unit 212 can generate a plurality of surface texture models 410 by changing the parameters. The surface texture is not limited to a one-dimensional Sin wave, and may be expressed by superimposing multidimensional (multidirectional) Sin waves. Instead of the Sin wave, a sawtooth wave, a rectangular wave, a triangular wave, or the like may be used.

In the defect model 420 generated by the defect model generation unit 213, the defect is represented by the shape and its parameters. In the case of the drawing, the shape of the defect is a conical flaw, and the depth d, the width w, the refractive index, and the like are used as parameters. The defect model generation unit 213 can generate a plurality of defect models 420 by changing the shape and the parameters. The shape of the flaw is not limited to the conical shape, and may be a triangular pyramid shape, a quadrangular pyramid shape, or the like. Further, the type of defect is not limited to the flaw, and may be expressed by a dent, a foreign substance, a hole, a chip, or a crack.

By the way, as described above, in the simulation execution unit 215, an optical simulation is performed on each of the surface texture model 410 and the defect model 420. In this case, the number of times of simulations can be reduced as compared with a case where an optical simulation is performed on the target object 20.

For example, if the number of surface texture models 410 is N1, the number of defect models 420 is N2, and the number of optical conditions is N3, when performing optical simulation for each of the surface texture models 410 and the defect models 420, the number of times of optical simulations is N1×N3+N2×N3. On the other hand, since the number of objects 20 is N1×N2, when performing the optical simulation on the target object 20, the number of times of optical simulations is N1×N2×N3.

Specifically, if the number N1 of surface texture models 410 is 100, the number N2 of defect models 420 is 100, the number N3 of optical conditions is 100, and an optical simulation is performed for each of the surface texture models 410 and the defect models 420, the number of times of optical simulations is 20000. On the other hand, when the optical simulation is performed on the target object 20, the number of times of optical simulations is 1000000. Therefore, when the optical simulation is performed on each of the surface texture models 410 and the defect models 420, the number of times of optical simulations can be reduced to 1/50 as compared with the case where the optical simulation is performed on the target object 20.

As described above, in this embodiment, the number of times of optical simulations can be reduced as compared with the case where the optical simulation is performed on the target object 20, so that the surface texture image DB 225 and the defect image DB 226 described later can be efficiently generated.

Next, FIGS. 5A to 5C illustrate examples of the optical simulation by the simulation execution unit 215.

In the optical simulation by the simulation execution unit 215, a simulation model having the same configuration as that of the appearance inspection device 10 (FIG. 1) is assumed. Further, in the assumed simulation model, both or one of the polarizers 12 and 13 may be omitted as in the appearance inspection device 10 (FIG. 1). In the simulation model illustrated in the drawing, both of the polarizers 12 and 13 are omitted.

Specifically, the simulation execution unit 215 generates the defect image 421 by performing an optical simulation on the defect model 420 as illustrated in FIG. 5A. The generated defect image 421 is stored in the defect image DB 226 of the storage unit 220. Further, the simulation execution unit 215 generates the surface texture image 411 by performing an optical simulation on the surface texture model 410 as illustrated in FIG. 5B. The generated surface texture image 411 is stored in the surface texture image DB 225 of the storage unit 220.

Further, when the light from the illumination 11 in the simulation model cannot be regarded as only parallel light, the simulation execution unit 215, as illustrated in FIG. 5C, a background image 412 is generated by performing an optical simulation on the surface texture model 410, assuming a simulation model in which an aperture 15 for removing a parallel component is disposed in the front surface of the illumination 11.

When the angle αl of the illumination 11 and the angle αc of the camera 14 in the simulation model are equal to each other in a clear-field optical system, the defect image 421, the surface texture image 411, and the background image 412 are colored such that a strong light intensity area is close to white and a low light intensity area is gray close to black.

Further, when the angle αl of the illumination 11 and the angle αc of the camera 14 in the simulation model are different night-vision optical systems, the defect image 421, the surface texture image 411, and the background image 412 are colored such that a strong light intensity area is gray close to black and a low light intensity area is closed to white.

Figure 6:
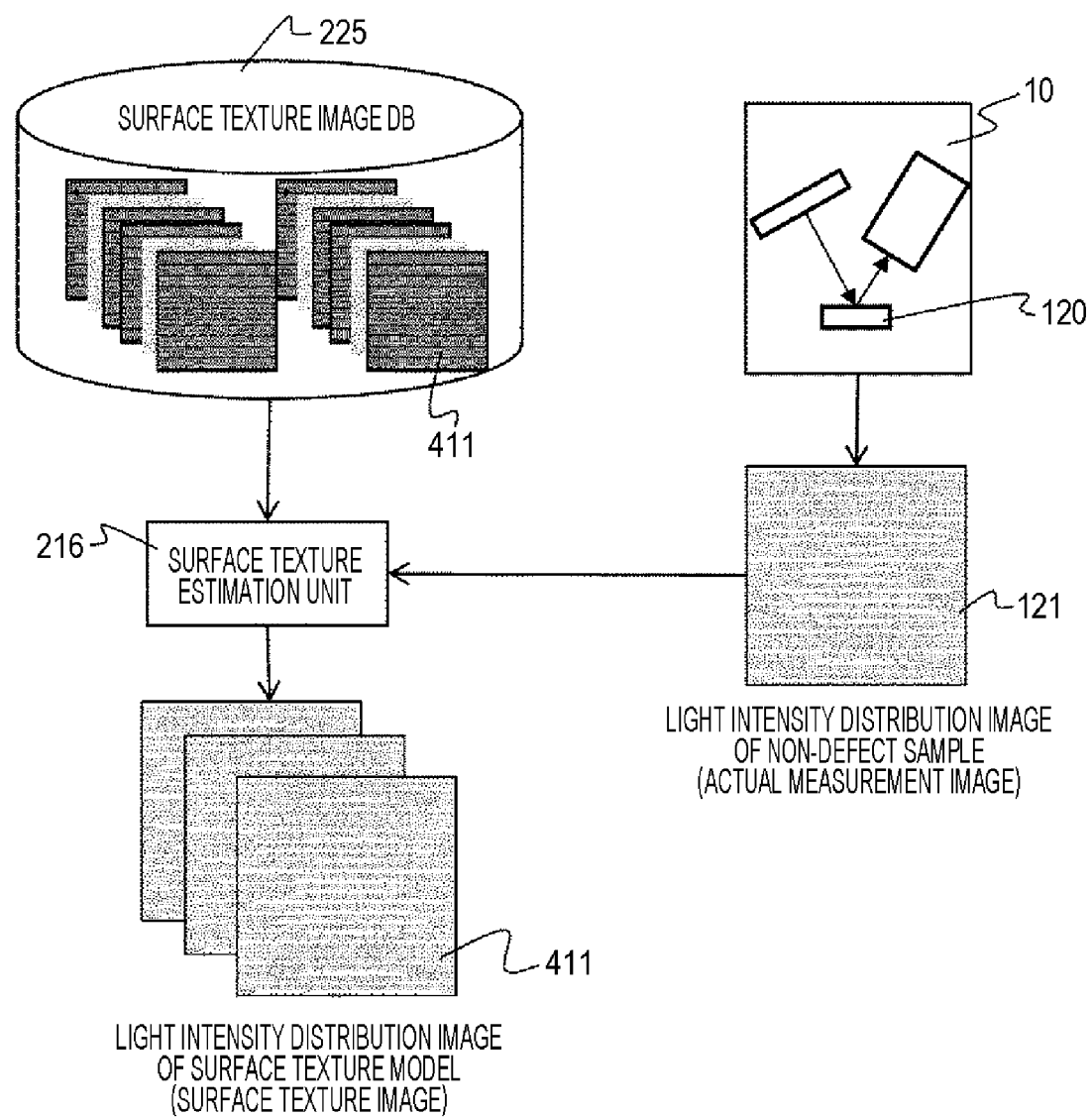
FIG. 6 is a diagram for explaining a method for estimating the surface texture of a non-defect model.

Next, FIG. 6 is a diagram for explaining a method for estimating the surface texture of the non-defect sample 120 by the surface texture estimation unit 216.

The surface texture estimation unit 216 selects an image most similar to the actual measurement image 121 which is generated by the optical simulation under the same optical condition as an optical condition when capturing the actual measurement image 121 and is obtained by capturing the non-defect sample 120 among the surface texture images 411 stored in the surface texture image DB 225 which are generated in advance, and specifies the surface texture model 410, where the selected surface texture image 411 is obtained, to the surface texture model 410 most similar to the surface texture of the non-defect sample 120. As an index for determining similarity, it is possible to use image variance, amplitude (difference between maximum intensity and minimum intensity), frequency analysis result, and the like. Further, artificial intelligence (AI) may be applied to the similarity determination in the surface texture estimation unit 216.

Further, the surface texture estimation unit 216 reads, from the surface texture image DB 225, a plurality of surface texture images 411 generated by an optical simulation under a plurality of optical conditions within the optical condition range set by the user for the specified surface texture model 410. The images are output to the image synthesizing unit 218.

Figure 7A:
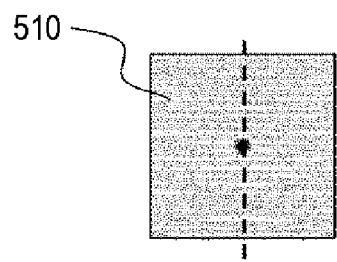
Figure 7B:
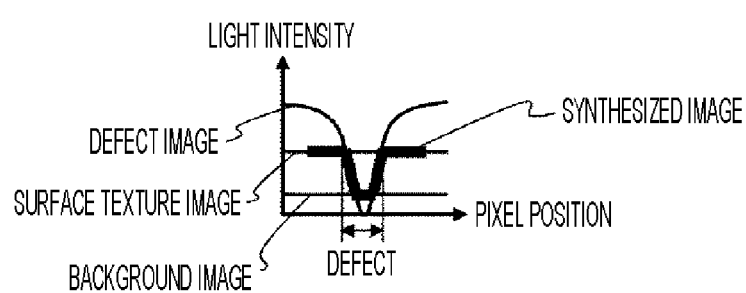

Next, FIGS. 7A and 7B are diagrams for explaining a method for generating a synthetic image by the image synthesizing unit 218. FIG. 7A illustrates an example of the synthetic image 510. FIG. 7B illustrates examples of the light intensities of the surface texture image 411, the defect image 421, the background image 412, and the synthetic image 510 at the position indicated by the broken line in FIG. 7A.

The image synthesizing unit 218 synthesizes the surface texture image 411 and the defect image 421 generated by the optical simulation under the same optical condition within the optical condition range set by the user to generate a synthetic image 510. Specifically, when the light from the illumination 11 in the simulation model can be regarded as parallel light only (when the size of the illumination 11 is sufficiently small etc.), the image synthesizing unit 218 compares the light intensity of the surface texture image 411 and the light intensity of the defect image 421 at the same coordinates and generates the synthetic image 510 by adopting the lower light intensity.

Further, when the light from the illumination 11 in the simulation model cannot be regarded as only parallel light (when the size of the illumination 11 is not sufficiently small etc.), the image synthesizing unit 218 adopts the median values of the light intensity of the surface texture image 411, the light intensity of the defect image 421, and the light intensity of the background image 412 at the same coordinates to generate the synthetic image 510 indicated by a thick line.

Figure 8:
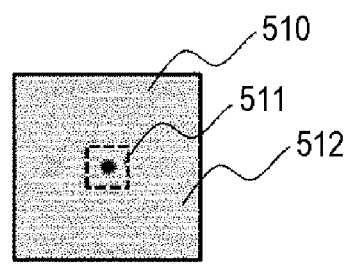
FIG. 8 is a diagram for explaining a method for calculating S/N of a synthetic image.

Next, FIG. 8 is a diagram for explaining a method for calculating the S/N of the synthetic image 510 by the evaluation value calculating unit 219.

The evaluation value calculating unit 219 divides the synthetic image 510 into a defect area 511 including a defect and the other normal area 512. For example, the difference between an average value of the light intensity of the normal area 512 and a minimum value of the light intensity of the defect area 511 is defined as a signal component S and twice ($2\sigma$) the variance $\sigma$ of the light intensity in the normal area 512 is defined as a noise component N, and the ratio S/N is calculated.

The definitions of the signal component S and the noise component N are not limited to the above examples. For example, the difference between the median value of the light intensity of the normal area 512 and the minimum value of the light intensity of the defect area 511 may be used as the signal component S, or the variance $\sigma$ of the light intensity of the normal area 521 may be used as the noise component N.

Figure 9:
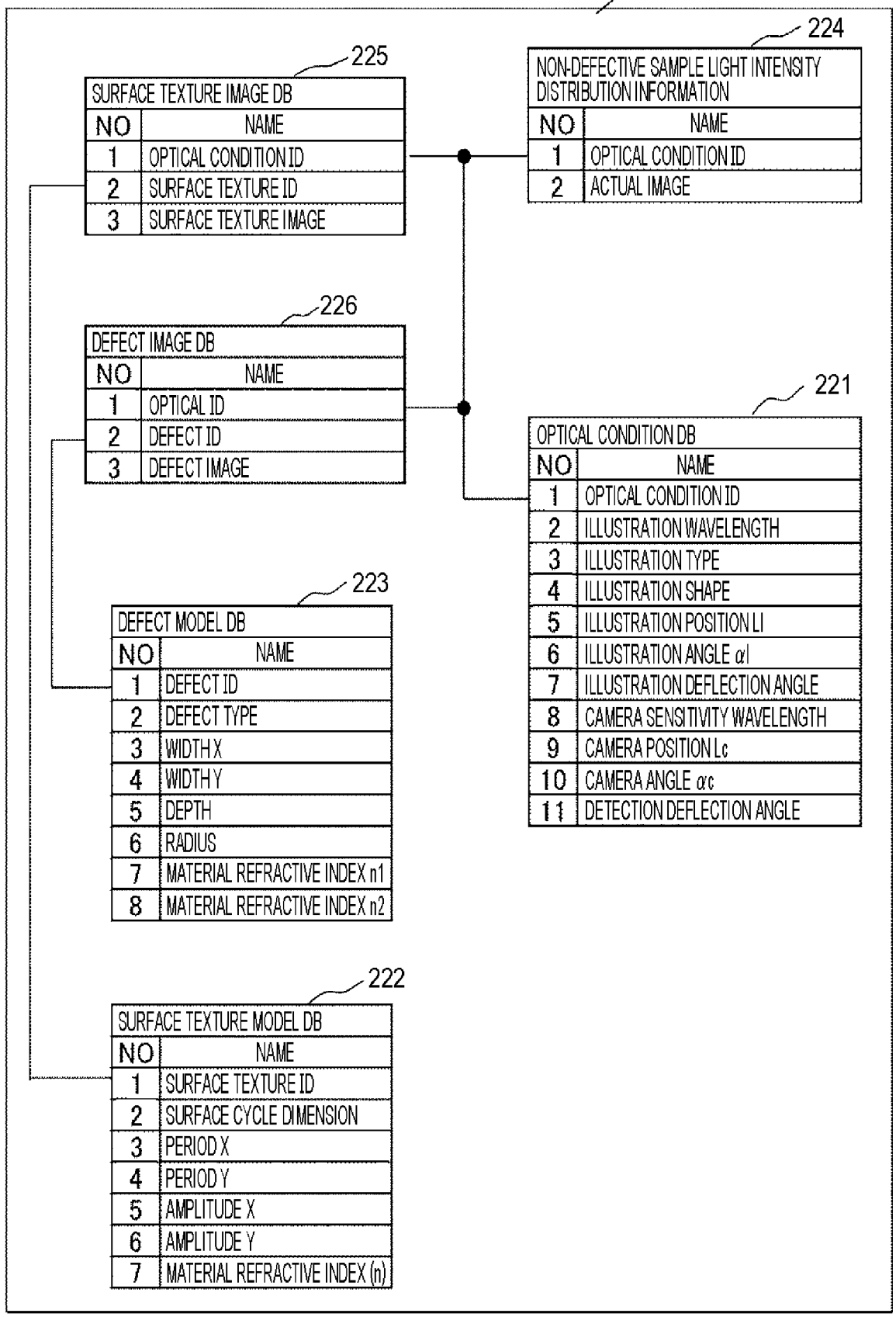
FIG. 9 is a diagram illustrating details of information and each DB stored in a storage unit.

Next, FIG. 9 illustrates details of each information and each DB stored in the storage unit 220.

The optical condition DB 221 manages information regarding a plurality of optical conditions set by the optical condition generation unit 214, and stores an illumination wavelength, an illumination type, an illumination shape, an illumination position Ll, an illumination angle αl, a presence/absence of the illumination deflection (the polarizer 12), a camera sensitivity wavelength, a camera position Lc, a camera angle αc, and a presence/absence of the detection deflection (the polarizer 13) in association with an optical condition ID (identifier) for identifying each optical condition.

The surface texture model DB 222 manages information regarding the plurality of surface texture models 410 generated by the surface texture model generation unit 212, and stores a surface cycle dimension, cycle X, cycle Y, amplitude X, amplitude Y, and material refractive index in association with a surface texture ID for identifying each surface texture model.

The defect model DB 223 manages information regarding the plurality of defect models 420 generated by the defect model generation unit 213, and stores a defect type, width X, width Y, depth, radius, material refractive index n1, and material refractive index n2 in association with a defect ID for identifying each defect model.

In the non-defect sample light intensity distribution information 224, an optical condition ID when the non-defect sample 120 acquired from the appearance inspection device 10 is imaged and the actual measurement image 121 which is a light intensity distribution image of the non-defect sample 120 are recorded.

The surface texture image DB 225 manages the surface texture image 411 obtained as a result of the optical simulation for the surface texture model 410 by the simulation execution unit 215, and stores the optical condition ID at the time of the optical simulation and, the surface texture ID for identifying the surface texture model 410, and the surface texture image 411 in association with each other.

The optical condition ID in the surface texture image DB 225 is associated with the optical condition ID of the optical condition DB 221, the optical condition ID of the non-defect sample light intensity distribution information 224, and the optical condition ID of the defect image DB 226.

The defect image DB 226 manages the defect image 421 obtained as a result of the optical simulation for the defect model 420 by the simulation execution unit 215, and stores the optical condition ID at the time of the optical simulation, the defect ID for identifying the defect model 420, and the defect image 421 in association with each other. It is associated with the defect ID of the defect image DB 226.

Figure 10:
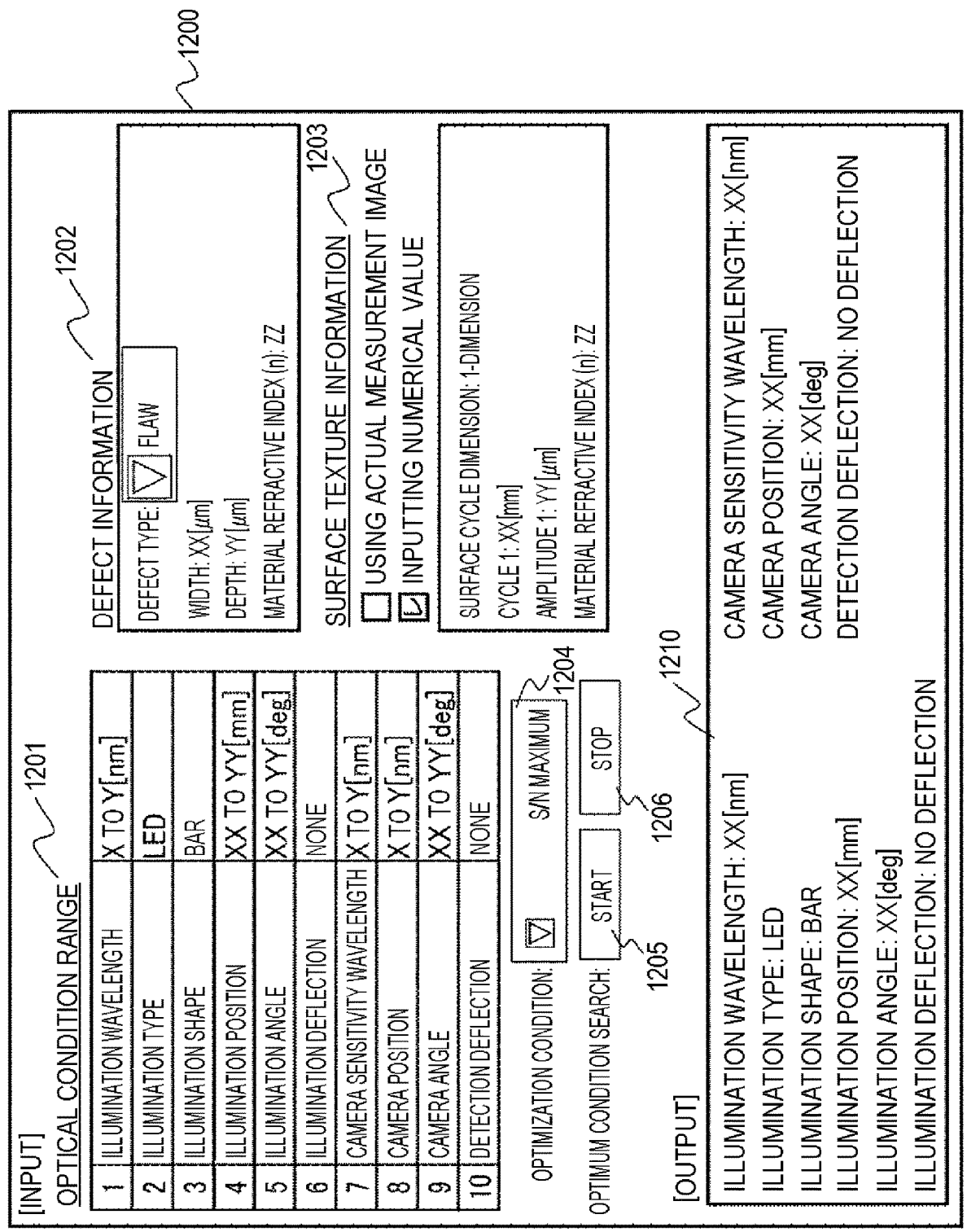
FIG. 10 is a diagram illustrating a display example of an operation screen.

Next, FIG. 10 illustrates a display example of the operation screen 1200 displayed on the display unit 233.

The operation screen 1200 is provided with an optical condition range input field 1201, a defect information input field 1202, a surface texture input field 1203, an optimization condition input field 1204, a start button 1205, a stop button 1206, and an optimum condition display field 1210.

The optical condition range input field 1201 is used by the user to input the range of optical conditions of the surface texture image 411 and the defect image 421 used for the synthetic image. The defect information input field 1202 is for the user to input the defect type and the parameter of the defect model 420 of the defect image 421 used for the synthetic image.

The surface texture input field 1203 is for the user to select "using an actual measurement image" or "inputting a numerical value". When "inputting a numerical value" is selected, the parameter of the surface texture model 410 of the surface texture image 411 used for the synthetic image can enter. On the other hand, when the user selects "using an actual measurement image", a synthetic image is generated using the actual measurement image 121 instead of the surface texture image 401.

The optimization condition input field 1204 is for the user to select and input an optimization condition (for example, S/N maximum, S/N stability, etc.) when searching for the optimum optical condition.

The start button 1205 is used by the user to instruct the start of the optimum condition search process described later. The stop button 1206 is for the user to interrupt the optimum condition search process.

The optimum condition display field 1210 displays the optimum optical condition obtained as a result of the optimum condition search process.

<Optimum Condition Search Process by First Configuration Example of Information Processing Device 200>

Figure 11:
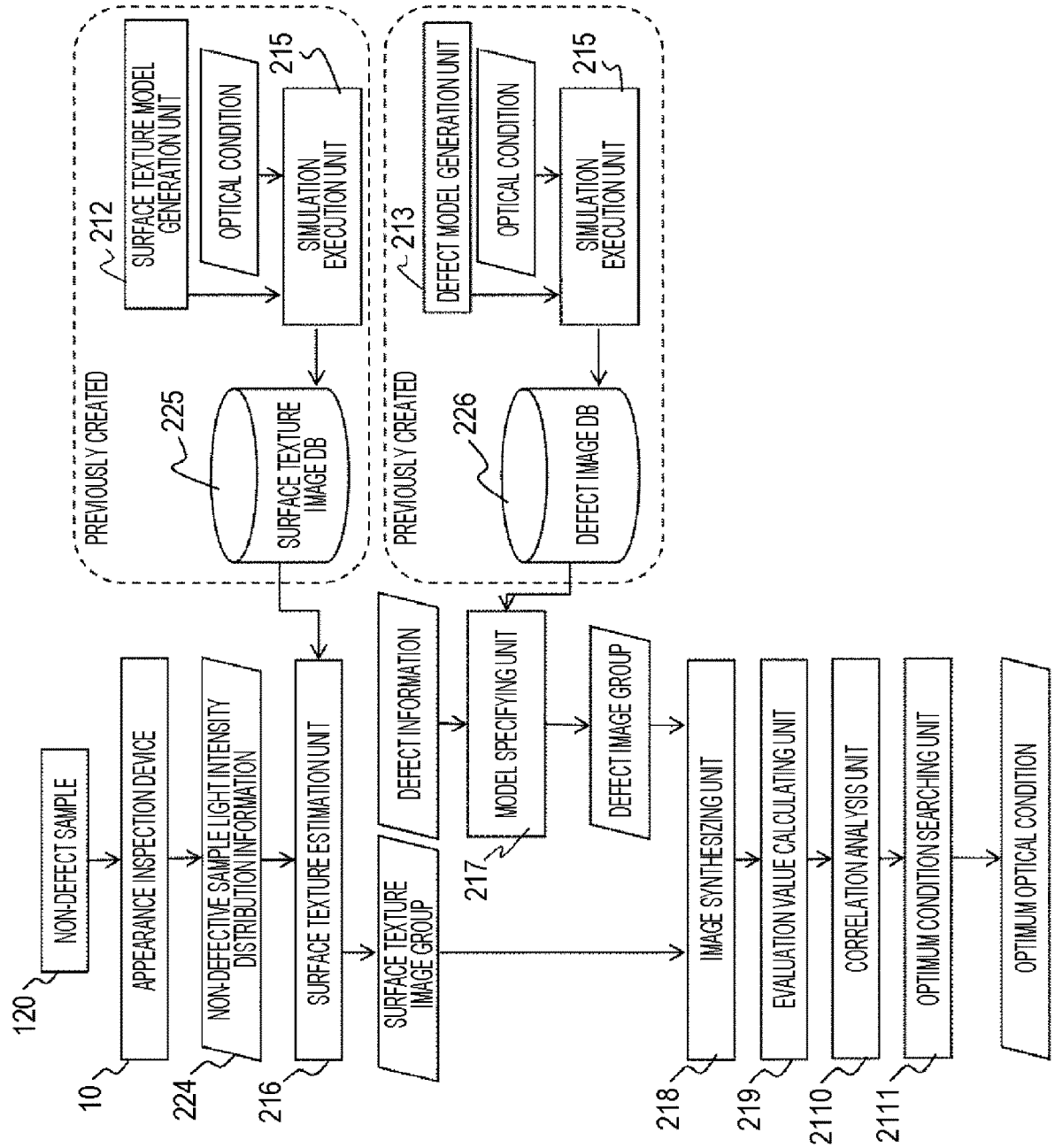
FIG. 11 is a diagram for explaining an outline of an operation subject and an information flow in an optical condition determination process according to the first configuration example of the information processing device.
Figure 12:
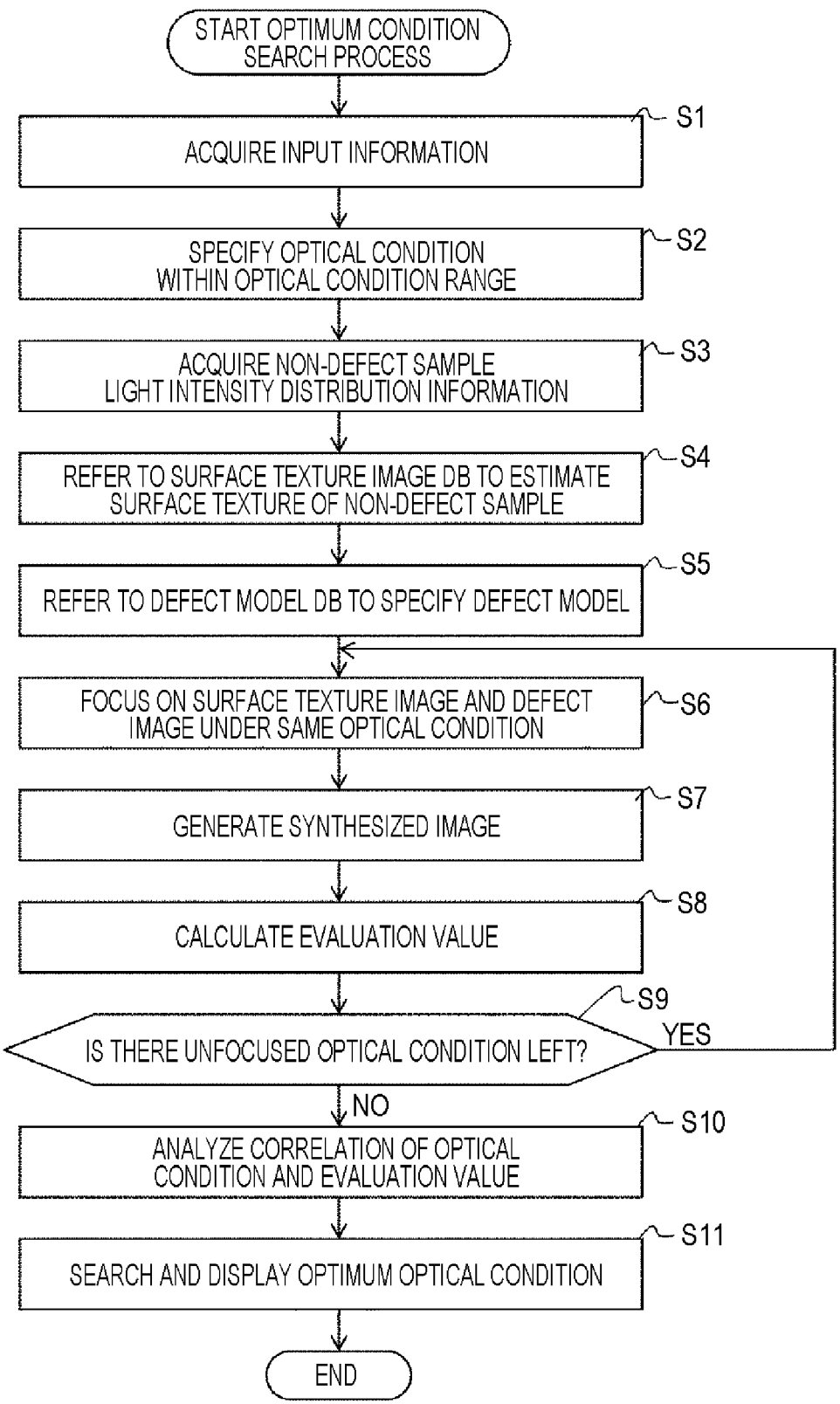
FIG. 12 is a flowchart for explaining an example of the optical condition determination process according to the first configuration example of the information processing device.

Next, the optimum condition search process according to the first configuration example of the information processing device 200 will be described with reference to FIGS. 11 and 12. FIG. 11 illustrates the outline of the operation subject and the information flow in the optimum condition search process according to the first configuration example. FIG. 12 is a flowchart for explaining an example of the optimum condition search process according to the first configuration example.

As a premise of the optimum condition search process according to the first configuration example, a surface texture model 410 and a defect model 420 are generated in advance, an optical simulation for these models is performed. It is assumed that the optical condition DB 221, the surface texture model DB 222, the defect model DB 223, the surface texture image DB 225, and the defect image DB 226 are recorded in the storage unit 220.

The optimum condition search process according to the first configuration example is started in response to a pressing operation of the start button 1205 on the operation screen 1200 by the user.

First, the processing unit 210 acquires information (input information) input by the user with respect to the optical condition range input field 1201 of the operation screen 1200, the defect information input field 1202, the surface texture input field 1203, and the optimization condition input field 1204 (Step S1).

Next, the optical condition generation unit 214 refers to the optical condition DB 221, and specifies a plurality of optical conditions within the optical condition range input by the user in the optical condition range input field 1201 (Step S2).

Next, the imaging control unit 211 controls the appearance inspection device 10 to image the non-defect sample 120, and acquires the non-defect sample light intensity distribution information 224 including the obtained actual measurement image 121 and the optical condition at the time of imaging, and stores the information in the storage unit 220 (Step S3). The appearance inspection device 10 may image the non-defect sample 120 in advance, and the non-defect sample light intensity distribution information 224 obtained at that time may be acquired.

Next, the surface texture estimation unit 216 estimates the surface texture of the non-defect sample 120. Specifically, a surface texture image, which is generated by an optical simulation under the same optical conditions as the optical conditions at the time of imaging the measurement image 121 and most similar to the actual measurement image 121, is selected among the surface texture images 411 stored in the surface texture image DB 225 so as to specify the surface texture model 410 most similar to the surface texture of the non-defect sample 120. Further, the surface texture estimation unit 216 reads, from the surface texture image DB 225, a plurality of surface texture images 411 generated by the optical simulation under the plurality of optical conditions specified in Step S2 with respect to the specified surface texture model 410. The surface texture images are output as a surface texture image group to the image synthesizing unit 218 (Step S4).

Next, the model specifying unit 217 refers to the defect model DB 223 and specifies the defect model 420 that matches the defect information input by the user in the defect information input field 1202. Then, the model specifying unit 217 reads, from the defect image DB 226, a plurality of defect images 421 generated by the optical simulation under the same optical condition specified in Step S2 for the specified defect model 420. The defect images are output as a defect image group to the image synthesizing unit 218 (Step S5).

Next, the image synthesizing unit 218 focuses on an unfocused optical condition among the plurality of optical conditions specified in Step S2, and specifies the surface texture image 411 and the defect image 421 corresponding to the focused optical condition in the surface texture image group and the defect image group (Step S6). Next, the image synthesizing unit 218 synthesizes the identified surface texture image 411 and the identified defect image 421 to generate the synthetic image 510 (Step S7). Next, the evaluation value calculating unit 219 calculates the S/N of the synthetic image 510 (Step S8).

Next, the image synthesizing unit 218 determines whether an unfocused optical condition remains among the plurality of optical conditions specified in Step S2 (Step S9). Here, when the image synthesizing unit 218 determines that the unfocused optical condition remains (YES in Step S9), the process is returned to Step S6, and Steps S6 to S9 are repeated. That is, the unfocused optical conditions are sequentially focused on, the surface texture image 411 and the defect image 421 corresponding to the optical condition are synthesized to generate the synthetic image 510, and the S/N thereof is calculated. After that, when the image synthesizing unit 218 determines that the unfocused optical condition does not remain (NO in Step S9), the process proceeds to Step S10.

Next, the correlation analysis unit 2110 analyzes the correlation between the S/N and the optical condition corresponding to each of the generated synthetic images 510 (Step S10). Next, the optimum condition searching unit 2111 searches for an optimum optical condition that satisfies the optimization condition selected by the user in the optimization condition input field 1204 on the operation screen 1200 based on the correlation between the optical condition and the S/N. Then, the processing unit 210 displays the searched optimum optical condition in the optimum condition display field 1210 of the operation screen 1200 (Step S11).

With the above, the optimum condition search process according to the first configuration example of the information processing device 200 is completed.

According to the optimum condition search process of the first configuration example, the optimum optical condition is searched for by using the optical simulation result for the surface texture model 410 that most resembles the surface shape of the non-defect sample 120, so that the difference between the optical simulation and actual measurement can be suppressed. Therefore, it becomes possible to derive the optimum optical condition for the appearance inspection.

<Second Configuration Example of Information Processing Device 200>

Figure 13:
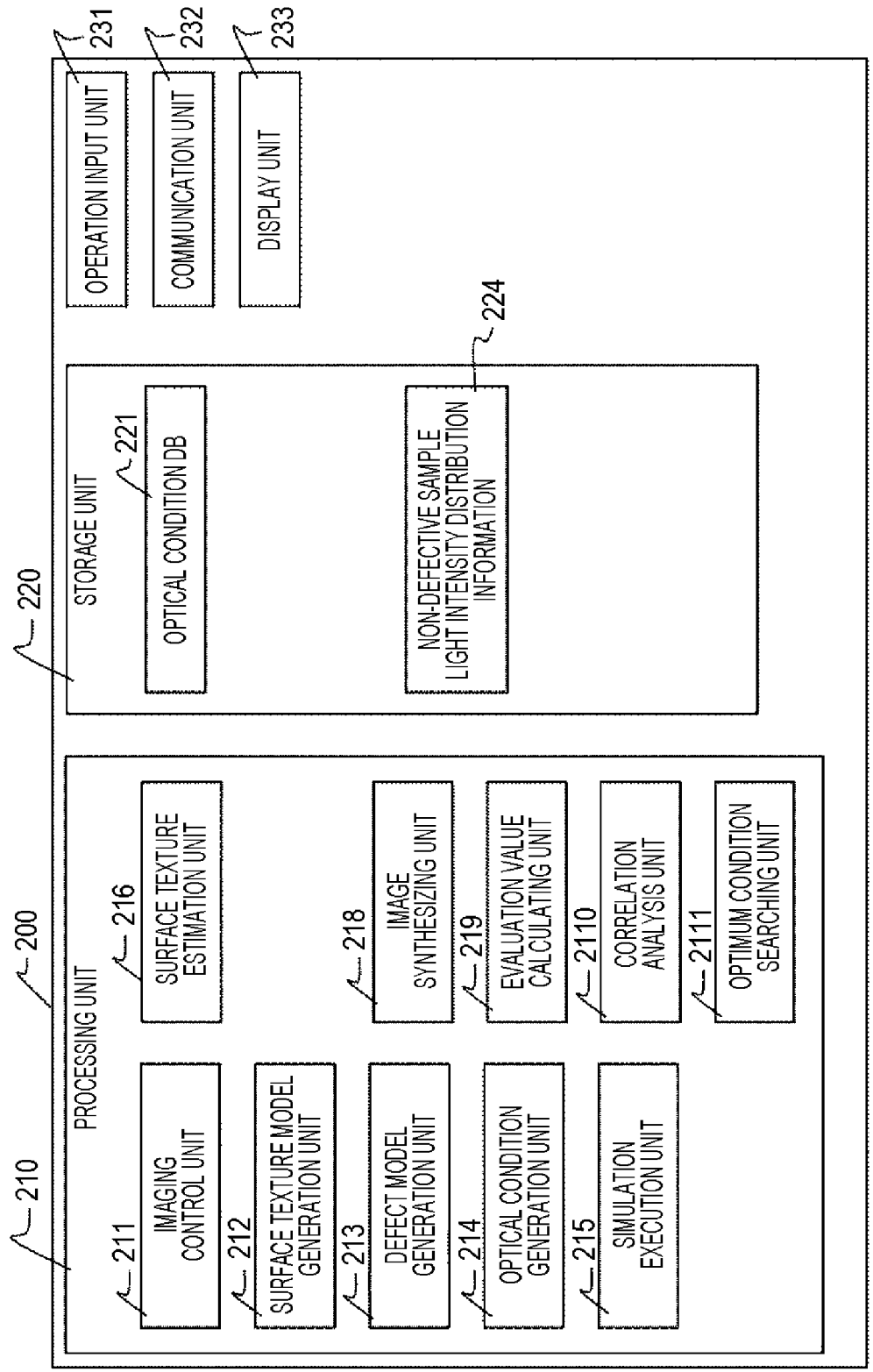
FIG. 13 is a diagram illustrating a second configuration example of the information processing device in the optical condition determination system.

Next, FIG. 13 illustrates a second configuration example of the information processing device 200. The second configuration example is one in which the model specifying unit 217, the surface texture model DB 222, the defect model DB 223, the surface texture image DB 225, and the defect image DB 226 are omitted from the first configuration example (FIG. 3). The same reference numerals as those of the first configuration example are attached to the components, and the description thereof will be omitted.

<Optimum Condition Search Process by Second Configuration Example of Information Processing Device 200>

Figure 14:
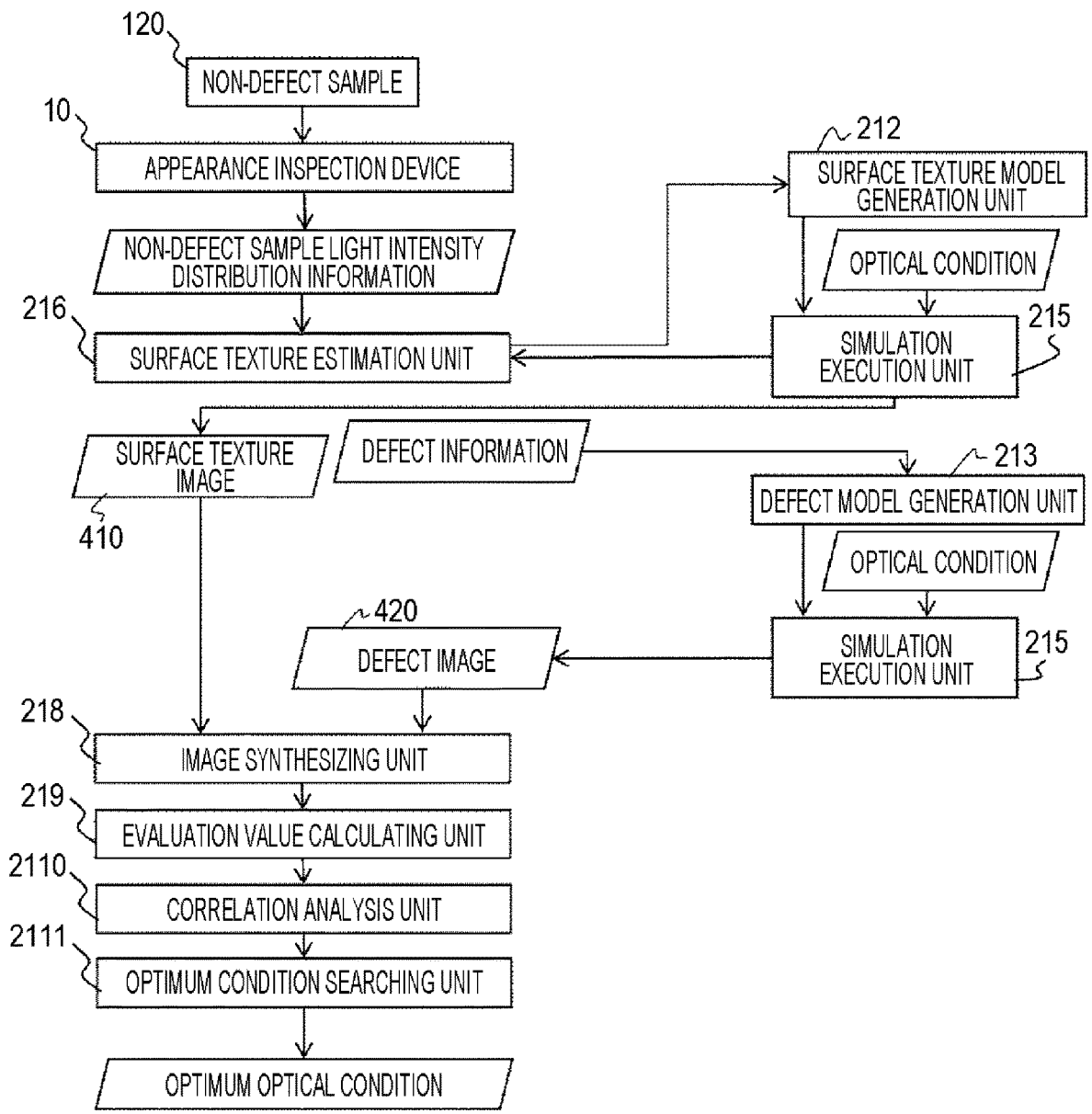
FIG. 14 is a diagram for explaining an outline of an operation subject and information flow in the optical condition determination process according to a second configuration example of the information processing device.
Figure 15:
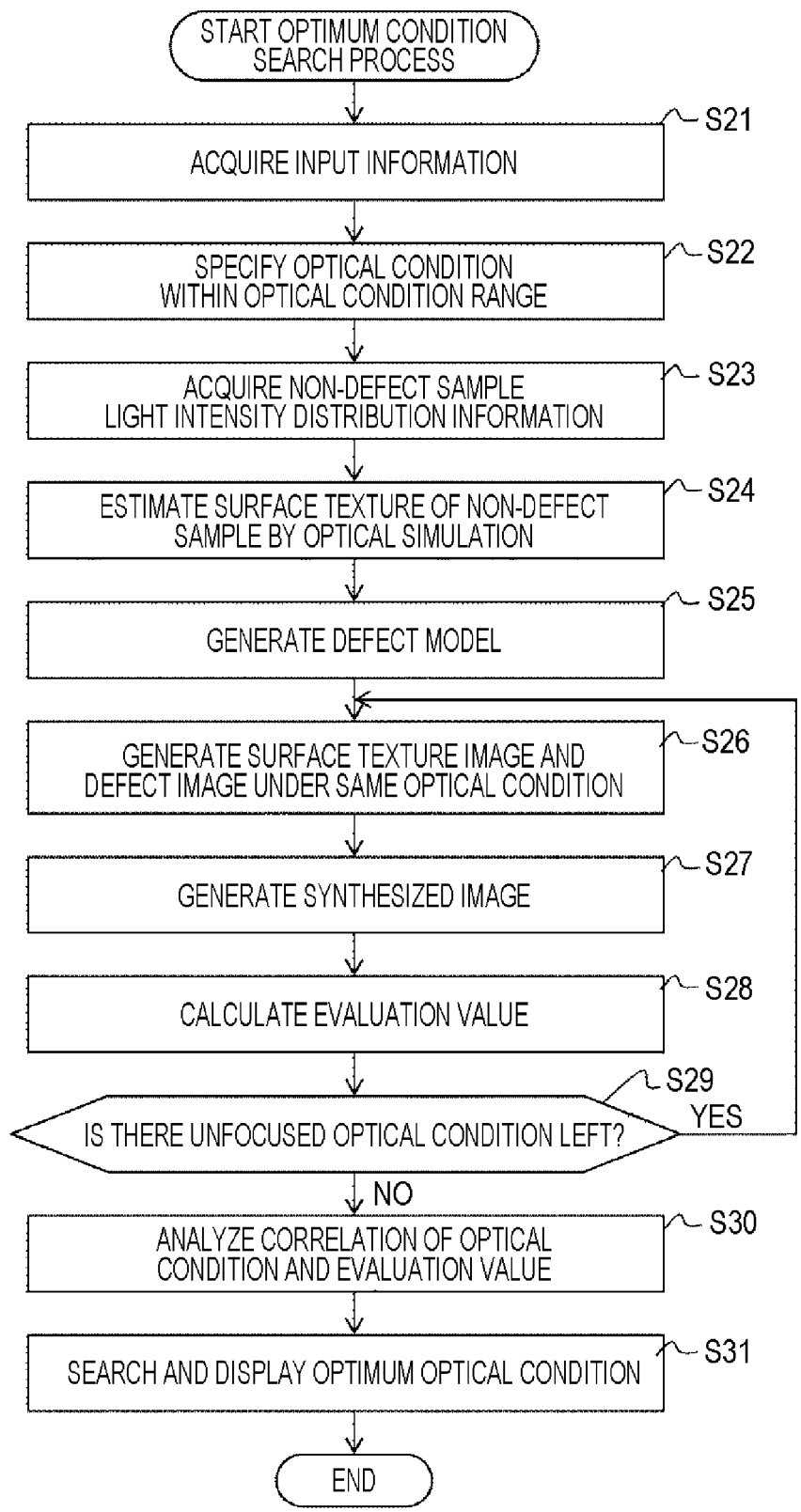
FIG. 15 is a flowchart illustrating the optical condition determination process according to the second configuration example of the information processing device.

The optimum condition search process according to the second configuration example of the information processing device 200 will be described with reference to FIGS. 14 and 15. FIG. 14 illustrates an outline of the operation subject and the information flow in the optimum condition search process according to the second configuration example. FIG. 15 is a flowchart illustrating an example of the optimum condition search process according to the second configuration example.

In the optimum condition search process according to the first configuration example described above, it is premised that the surface texture image DB 225, the defect image DB 226, and the like are generated in advance. In the optimum condition search process according to the second configuration example, the optical simulation for the surface texture model 410 and the defect model 420 is not performed in advance. Therefore, it is assumed that the surface texture image DB 225 and the defect image DB 226 are not generated in advance, and only the optical condition DB 221 is recorded in the storage unit 220.

Further, Steps S21 to S23 of the optimum condition search process according to the second configuration example are the same as Steps S1 to S3 of the optimum condition search process according to the first configuration example (FIG. 12), and thus the description thereof will be appropriately simplified.

The optimum condition search process according to the second configuration example is started in response to a pressing operation of the start button 1205 on the operation screen 1200 by the user.

First, the processing unit 210 acquires information (input information) input by the user on the operation screen 1200 (Step S21).

Next, the optical condition generation unit 214 refers to the optical condition DB 221, and specifies a plurality of optical conditions within the optical condition range input by the user in the optical condition range input field 1201 (Step S22).

Next, the imaging control unit 211 acquires non-defect sample light intensity distribution information (the actual measurement image 121 and the optical conditions at the time of imaging) and stores the information in the storage unit 220 (Step S23). The appearance inspection device 10 may image the non-defect sample 120 in advance, and the non-defect sample light intensity distribution information 224 obtained at that time may be acquired.

Next, the surface texture estimation unit 216 estimates the surface texture of the non-defect sample 120 (Step S24). Specifically, the surface texture estimation unit 216 controls the surface texture model generation unit 212 to generate the surface texture model 410, and causes the simulation execution unit 215 to execute the optical simulation of the generated surface texture model 410 under the same optical condition as an optical condition when capturing the actual measurement image 121. The surface texture image 411 is acquired and compared with the actual measurement image 121. Then, until the difference between the actual measurement image 121 and the surface texture image 411 becomes equal to or less than a predetermined threshold value, the surface texture estimation unit 216 controls the surface texture model generation unit 212 to update the surface texture model 410. The surface texture model 410 obtained finally becomes an estimation result of the surface texture of the non-defect sample 120.

The parameters for generating the surface texture model 410 in Step S24 may be set by the surface texture model generation unit 212, or may be input by the user in the surface texture input field 1203 of the operation screen 1200.

Next, the defect model generation unit 213 generates the defect model 420 corresponding to the defect information input by the user in the defect information input field 1202 of the operation screen 1200, and outputs the generated defect model 420 to the simulation execution unit 215 (Step S25).

Next, the simulation execution unit 215 focuses on an unfocused optical condition among the plurality of optical conditions specified in Step S22 with respect to the surface texture model 410 estimated in Step S24 and the defect model 420 generated in Step S25. The surface texture image 411 and the defect image 421 are generated by performing an optical simulation under the optical condition and output to the image synthesizing unit 218 (Step S26).

Next, the image synthesizing unit 218 synthesizes the surface texture image 411 and the defect image 421 to generate a synthetic image 510 (Step S27). Next, the evaluation value calculating unit 219 calculates the S/N of the synthetic image (Step S28).

Next, the simulation execution unit 215 determines whether an unfocused optical condition remains among the plurality of optical conditions specified in Step S2 (Step S29). Here, when the simulation execution unit 215 determines that the unfocused optical condition remains (YES in Step S29), the process is returned to Step S26, and Steps S26 to S29 are repeated. That is, the unfocused optical conditions are sequentially focused on, the optical simulation is performed under the optical conditions to generate the surface texture image 411 and the defect image 421, the synthetic image 510 is generated, and the S/N thereof is calculated. After that, when the simulation execution unit 215 determines that the unfocused optical condition does not remain (NO in Step S29), the process proceeds to Step S30.

Next, the correlation analysis unit 2110 analyzes the correlation between the optical condition and the S/N corresponding to each of the generated synthetic images (Step S30). Next, the optimum condition searching unit 2111 searches for an optimum optical condition that satisfies the optimization condition selected by the user in the optimization condition input field 1204 on the operation screen 1200 based on the correlation between the optical condition and the S/N. Then, the processing unit 210 displays the searched optimum optical condition in the optimum condition display field 1210 of the operation screen 1200 (Step S31).

With the above, the optimum condition search process according to the second configuration example of the information processing device 200 is completed.

According to the optimum condition search process of the second configuration example, the same effect as that of the optimum condition search process of the first configuration example can be obtained.

Further, according to the optimum condition search process of the second configuration example, when the surface texture of the non-defect sample 120 is estimated, the surface texture model 410 similar to the surface texture of the non-defect sample 120 is generated using optical simulation. Therefore, the surface texture of the non-defect sample 120 can be estimated with higher accuracy as compared with the optimum condition search process according to the first configuration example. Therefore, it becomes possible to derive the optimum optical condition by the appearance inspection.

Further, according to the optimum condition search process of the second configuration example, it is possible to omit the step of generating the surface texture image DB 225, the defect image DB 1026, and the like in advance.

<Third Configuration Example of Information Processing Device 200>

Figure 16:
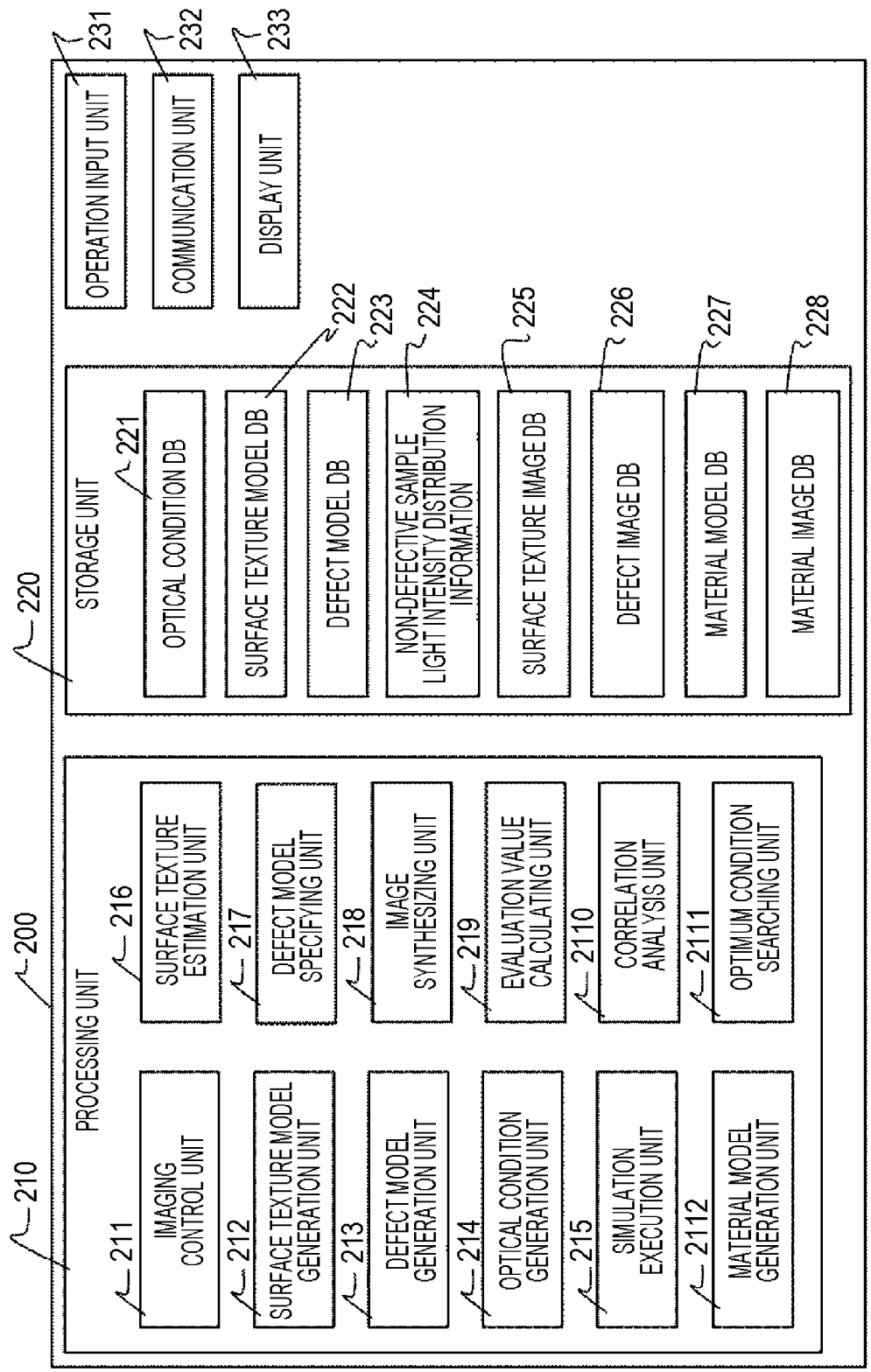
FIG. 16 is a diagram illustrating a third configuration example of the information processing device.

Next, FIG. 16 illustrates a third configuration example of the information processing device 200. The third configuration example is obtained by adding a material model generation unit 2112, a material model DB 227, and a material image DB 228 to the first configuration example (FIG. 3). The other components will be given with the same reference numerals as those of the first configuration example and description thereof will be omitted.

The material model generation unit 2112 generates a plurality of material models 430 (FIG. 17) having different material characteristics (for example, refractive index), and stores information regarding the generated material models 430 in the material model DB 227 of the storage unit 220. In addition to the refractive index, reflectance, absorptance, or the like may be adopted as the material property.

Figure 17:
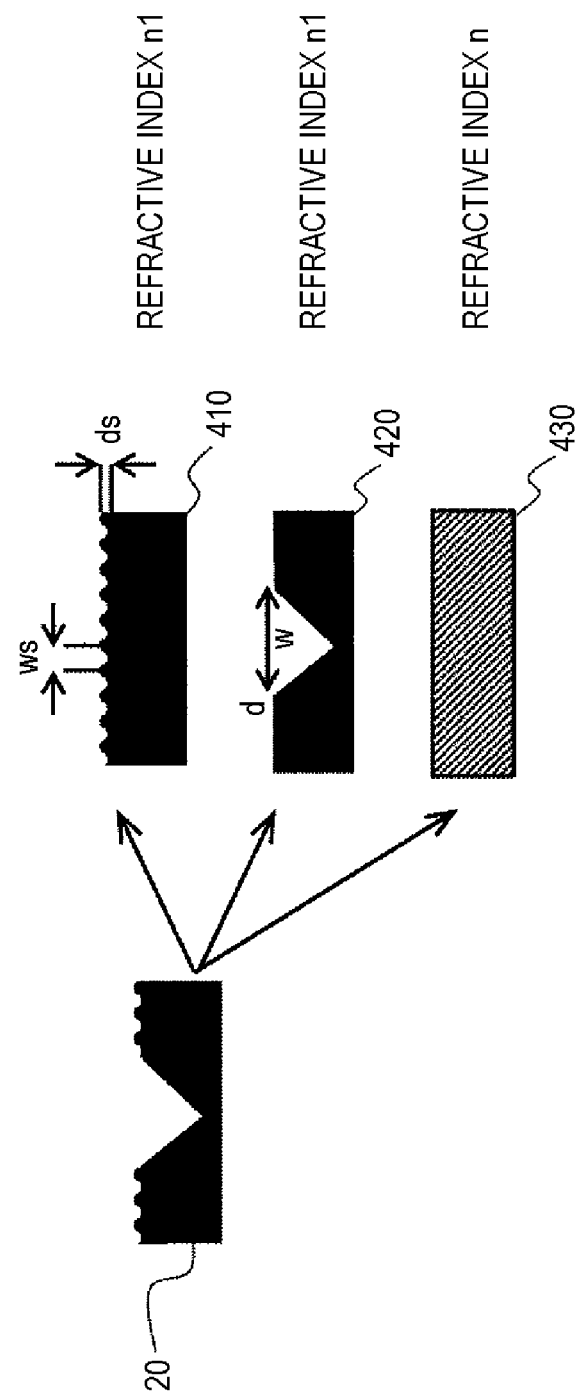
FIG. 17 is a diagram illustrating an example of a surface texture model, a defect model, and a material model.

FIG. 17 illustrates an example of the surface texture model 410, the defect model 420, and the material model 430. In the third configuration example of the information processing device 200, the target object 20 in which the surface texture is not flat but has a defect is modeled separately into the surface texture model 410 having a refractive index n1 that reflects only the surface texture of the target object 20 without having defect, the defect model 420 having the refractive index n1 that reflects only the defect of the target object 20, and the material model 430 having a refractive index n2 different from the refractive index n1, of which the surface texture is flat and has no defect. As described above, with the material model 430, it is not necessary to provide a plurality of surface texture models 410 and defect models 420 that differ only in the refractive index of the material. Thus, in the third configuration example, it is possible to further reduce the number of times of optical simulations performed in advance as compared with the first configuration example.

The description returns to FIG. 16. The material model DB 227 manages information regarding the plurality of material models 430 generated by the material model generation unit 2112, and stores the refractive index of the material in association with the material ID for identifying each material model 430 (not illustrated).

The material image DB 228 manages a material image 431 obtained as a result of the optical simulation for the material model 430 by the simulation execution unit 215, and an optical condition ID at the time of the optical simulation, a material ID for identifying the material model 430, and the material image 431 are stored in association with each other (not illustrated).

The image synthesizing unit 218 in the third configuration example synthesizes the surface texture image 411, the defect image 421, and the material image 431 generated by the optical simulation under the same optical condition to generate the synthetic image 510.

Specifically, as in the case of the first configuration example, after synthesizing the surface texture image 411 and the defect image 421, the synthetic image 510 is generated by multiplying the average value of the pixel values (light intensity) of the material image 431.

<Optimum Condition Search Process by Third Configuration Example of Information Processing Device 200>

Figure 18:
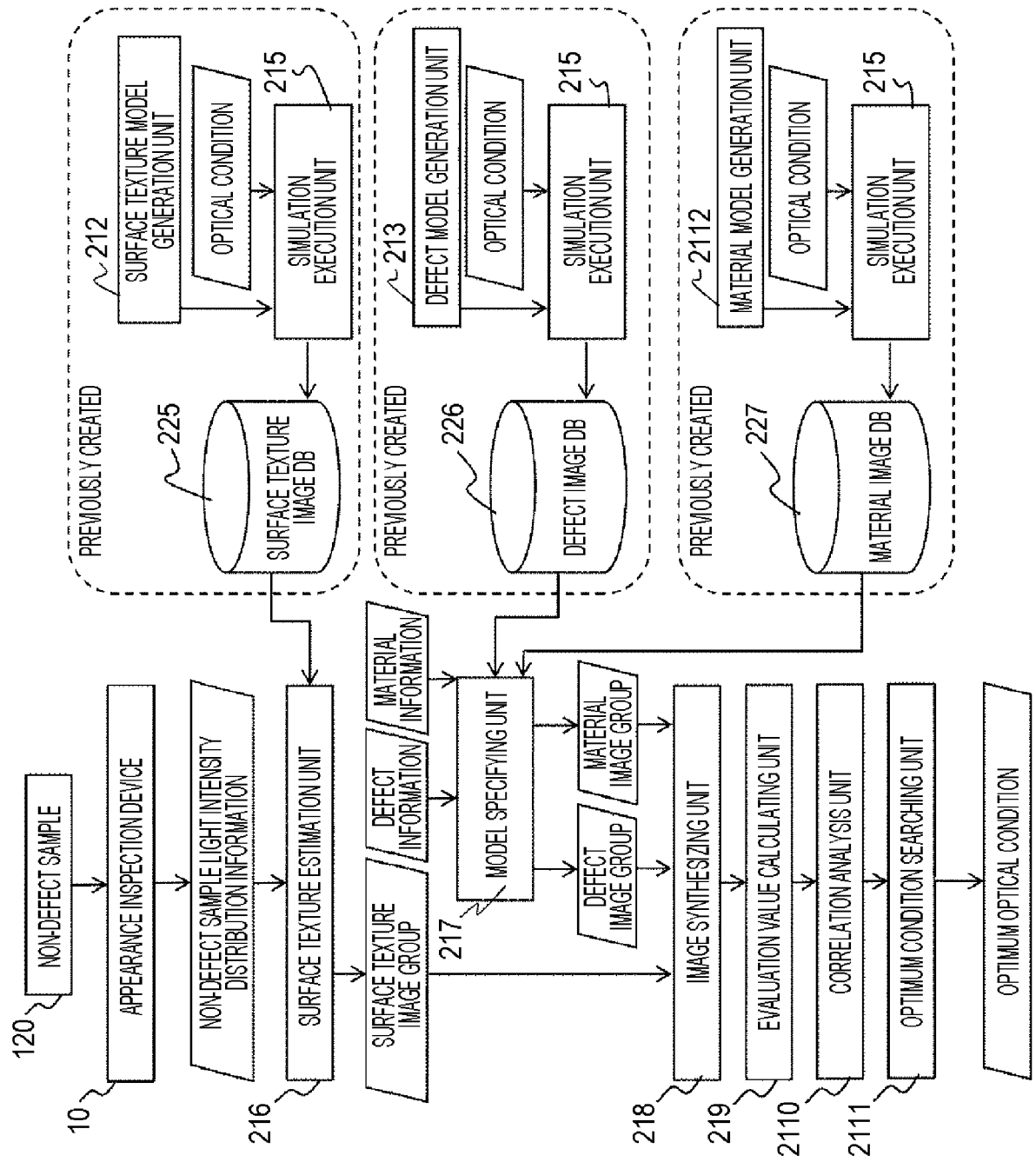
FIG. 18 is a diagram for explaining an outline of an operation subject and information flow in the optical condition determination process by the third configuration example of the information processing device.
Figure 19:
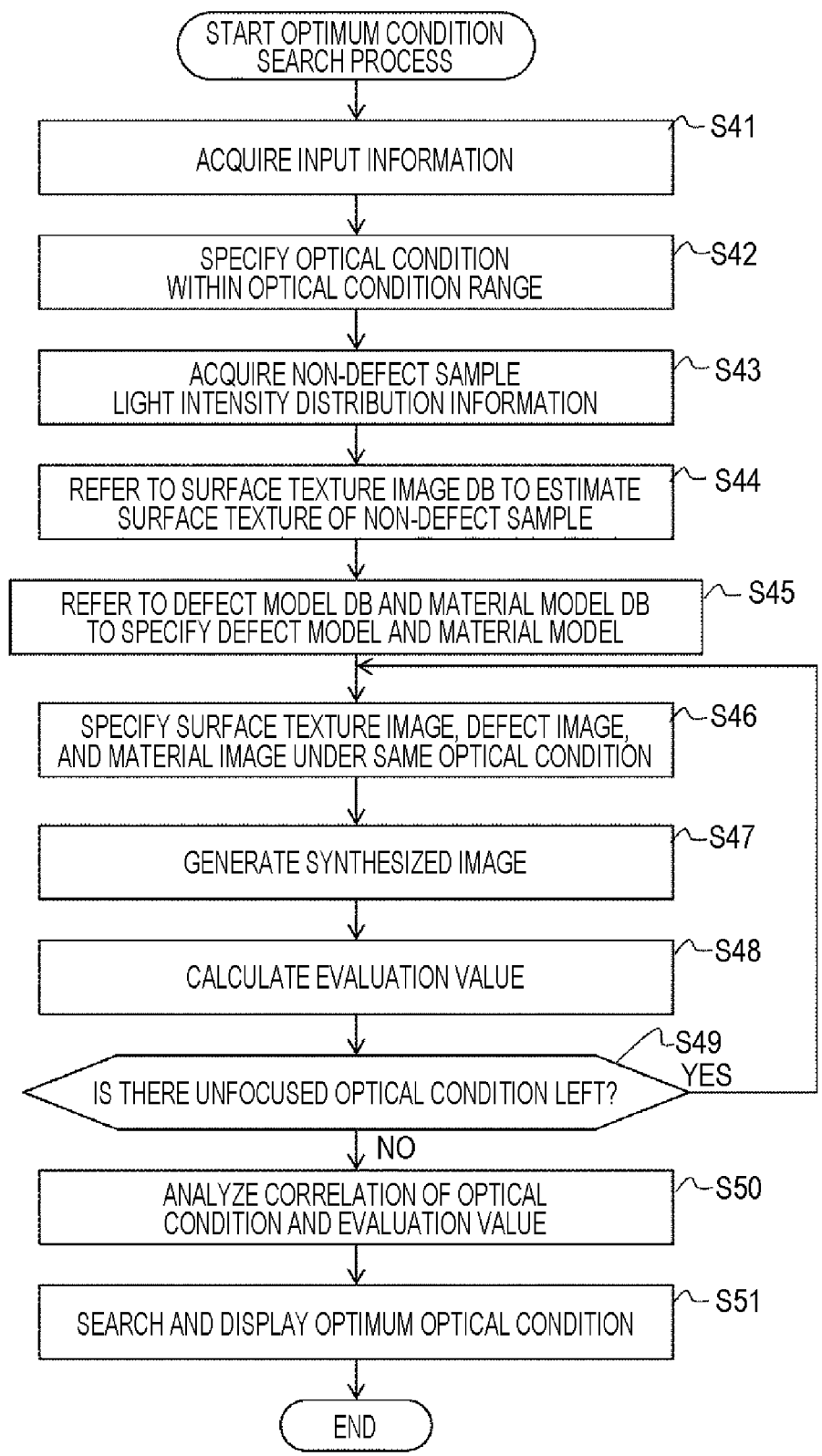
FIG. 19 is a flowchart illustrating an example of the optical condition determination process according to the third configuration example of the information processing device.

Next, the optimum condition search process according to the third configuration example of the information processing device 200 will be described with reference to FIGS. 18 and 19. FIG. 18 illustrates an outline of the operation subject and the information flow in the optimum condition search process according to the third configuration example. FIG. 19 is a flowchart illustrating an example of the optimum condition search process according to the third configuration example.

As the premise of the optimum condition search process according to the third configuration example, the surface texture model 410, the defect model 420, and the material model 430 are generated in advance, and an optical simulation is performed on these models. The optical condition DB 221, the surface texture model DB 222, the defect model DB 223, the surface texture image DB 225, the defect image DB 226, the material model DB 227, and the material image DB 228 are recorded in the storage unit 220.

The optimum condition search process according to the third configuration example is started in response to a pressing operation of the start button 1205 on the operation screen 1200 by the user.

Further, Steps S41 to S44 of the optimum condition search process according to the third configuration example are the same as Steps S1 to S4 in the optimum condition search process according to the first configuration example (FIG. 12), and thus the description thereof will be appropriately simplified.

First, the processing unit 210 acquires information (input information) input by the user on the operation screen 1200 (Step S41). Further, the operation screen 1200 is provided with a material information input field (not illustrated) in which the refractive index of the material model 430 can be input as input information.

Next, the optical condition generation unit 214 specifies a plurality of optical conditions that falls within the optical condition range input by the user (Step S42).

Next, the imaging control unit 211 acquires the non-defect sample light intensity distribution information 224 from the appearance inspection device 10 and stores the information in the storage unit 220 (Step S43).

Next, the surface texture estimation unit 216 estimates the surface texture of the non-defect sample 120, that is, specifies the surface texture model 410 most similar to the surface texture of the non-defect sample 120, and outputs the surface texture image group corresponding to the specified surface texture model 410 to the image synthesizing unit 218 (Step S44).

Next, the model specifying unit 217 refers to the defect model DB 223 and the material model DB 227, and specifies the defect model 420 closest to the defect information input to the defect information input field 1202 by the user and the material model 430 closest to the material information input to the material information input field (not illustrated). Then, the model specifying unit 217 reads, from the defect image DB 226 and the material image DB 228, a plurality of defect images 421 and material images 431 generated by the optical simulation under the same optical condition specified in Step S42 for the specified defect model 420 and the material model 430. The defect images are output as a defect image group and a material image group to the image synthesizing unit 218 (Step S45).

Next, the image synthesizing unit 218 focuses on an unfocused optical condition among the plurality of optical conditions specified in Step S42, and specifies the surface texture image 411, the defect image 421, and the material image 431 corresponding to the focused optical condition in the surface texture image group, the defect image group, and material image group (Step S46). Next, the image synthesizing unit 218 synthesizes the identified surface texture image 411, the identified defect image 421, and the material image 431 to generate the synthetic image 510 (Step S47). Next, the evaluation value calculating unit 219 calculates the S/N of the synthetic image 510 (Step S48).

Next, the image synthesizing unit 218 determines whether an unfocused optical condition remains among the plurality of optical conditions specified in Step S42 (Step S49). Here, when the image synthesizing unit 218 determines that the unfocused optical condition remains (YES in Step S49), the process is returned to Step S46, and Steps S46 to S49 are repeated. That is, the unfocused optical conditions are sequentially focused on, the surface texture image 411, the defect image 421, and the material image 431 corresponding to the optical condition are synthesized to generate the synthetic image 510, and the S/N thereof is calculated. After that, when the image synthesizing unit 218 determines that the unfocused optical condition does not remain (NO in Step S49), the process proceeds to Step S50.

Next, the correlation analysis unit 2110 analyzes the correlation between the optical condition and the S/N corresponding to each of the generated synthetic images 510 (Step S50). Next, the optimum condition searching unit 2111 searches for an optimum optical condition that satisfies the optimization condition selected by the user in the optimization condition input field 1204 on the operation screen 1200 based on the correlation between the optical condition and the S/N. Then, the processing unit 210 displays the searched optimum optical condition in the optimum condition display field 1210 of the operation screen 1200 (Step S51).

With the above, the optimum condition search process according to the third configuration example of the information processing device 200 is completed.

According to the optimum condition search process of the third configuration example, in addition to the same effect as the optimum condition search process of the first configuration example, the number of times of optical simulations to be executed in advance can be reduced as compared with the optimum condition search process according to the first configuration example.

Further, the invention is not limited to the above embodiments, but various modifications may be contained. In addition, the above-described embodiments have been described in detail in a clearly understandable way of the invention, and the invention is not necessarily limited to those having all the described components. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

Each of the above configurations, functions, processing units, processing means, and the like may be partially or entirely achieved by hardware by, for example, designing by an integrated circuit. Each of the above configurations, functions, and the like may be achieved by software by interpreting and executing a program that achieves each function by a processor. Information such as a program, a table, and a file for achieving each function can be stored in a recording device such as a memory, a hard disk, or a solid-state drive (SSD), or a recording medium such as an integrated circuit (IC) card, a secure digital (SD) card, or a digital versatile disc (DVD).

In addition, only control lines and information lines considered to be necessary for explanation are illustrated, but not all the control lines and the information lines for a product are illustrated. In practice, almost all the configurations may be considered to be connected to each other.

What is claimed is:

1. An optical condition determination system for determining an optical condition to be applied to an appearance inspection, comprising:
   a processor configured to
   perform an optical simulation on a surface texture model that models a surface texture of a target object of the appearance inspection, and a defect model that models a defect of the target object, under a plurality of optical conditions to generate a surface texture image and a defect image;
   synthesize the surface texture image and the defect image generated by the optical simulation under the same optical condition to generate a synthetic image;
   calculate an evaluation value representing easiness of detecting the defect in the synthetic image;
   analyze a correlation between an optical condition and the evaluation value corresponding to the synthetic image; and
   search for the optical condition suitable for the appearance inspection based on an analysis result of the correlation.

2. The optical condition determination system according to claim 1, wherein the processor is further configured to
   estimate a surface texture of a non-defect sample having no defect as the target object; and
   generate a synthetic image by synthesizing the surface texture image and the defect image generated by an optical simulation under the same optical condition for the surface texture model specified as an estimation result of the surface texture of the non-defect sample and a defect model matched to input information from a user.

3. The optical condition determination system according to claim 2, wherein the processor is further configured to
   compare an actual measurement image obtained by imaging the non-defect sample and one or a plurality of surface texture images generated by an optical simulation under the same optical condition as an optical condition when imaging the non-defect sample with respect to one or the plurality of the surface texture models to estimate the surface texture of the non-defect sample; and
   specify the surface texture model as an estimation result.

4. The optical condition determination system according to claim 2, further comprising:
   a surface texture image database (DB) that stores a plurality of the surface texture images previously generated by the optical simulation under a plurality of optical conditions for each of the plurality of surface texture models; and
   a defect image database (DB) that stores a plurality of the defect images previously generated by the optical simulation under a plurality of optical conditions for each of the plurality of defect models,
   wherein the processor compares an actual measurement image obtained by imaging the non-defect sample and a plurality of surface texture images generated by the optical simulation under the same optical condition as an optical condition when imaging the non-defect sample among a plurality of surface texture images previously stored in the surface texture image DB to estimate a surface texture of the non-defect sample, and specifies the surface texture model as an estimation result.

5. The optical condition determination system according to claim 4, wherein the processor is further configured to
   synthesize the surface texture image and the defect image generated by the optical simulation under the same optical condition with respect to the surface texture model specified as the estimation result of the surface texture of the non-defect sample and the defect model matched to the input information from the user among the plurality of surface texture images previously stored in the surface texture image DB and the plurality of defect images previously stored in the defect image DB to generate the synthetic image.

6. The optical condition determination system according to claim 4, wherein the processor is further configured to
   generate a material model that models characteristics of a material of the target object; and
   a material image database (DB) that stores a plurality of material images previously generated by the optical simulation under a plurality of optical conditions for each of the plurality of material models,
   wherein the processor synthesizes the surface texture image, the defect image, and the material image generated by the optical simulation under the same optical condition with respect to the surface texture model specified as the estimation result of the surface texture of the non-defect sample, the defect model matched to the input information from the user, and the material model among a plurality of surface texture images previously stored in the surface texture image DB, a plurality of defect images previously stored in the defect image DB, and a plurality of material images previously stored in the material image DB to generate the synthetic image.

7. The optical condition determination system according to claim 6, further comprising:
- a server device that includes at least one of the surface texture image DB, the defect image DB, and the material image DB,
- wherein the server device is shared by a plurality of different information processing devices.

8. The optical condition determination system according to claim 1, wherein the processor is further configured to
- generates the surface texture model; and
- generate the defect model.

9. An optical condition determination method by an optical condition determination system for determining an optical condition to be applied to an appearance inspection, the method comprising:
- a simulation execution step for performing an optical simulation on a surface texture model that models a surface texture of a target object of the appearance inspection, and a defect model that models a defect of the target object, under a plurality of optical conditions to generate a surface texture image and a defect image;
- an image synthesizing step for synthesizing the surface texture image and the defect image generated by an optical simulation under the same optical condition to generate a synthetic image;
- an evaluation value calculation step for calculating an evaluation value representing easiness of detecting the defect in the synthetic image;
- a correlation analysis step for analyzing a correlation between an optical condition and the evaluation value corresponding to the synthetic image; and
- an optimum condition searching step for searching for the optical condition suitable for the appearance inspection based on an analysis result of the correlation.

10. The optical condition determination method according to claim 9, further comprising:
- a surface texture estimation step for estimating a surface texture of a non-defect sample having no defect as the target object,
- wherein, in the image synthesizing step, a synthetic image is generated by synthesizing the surface texture image and the defect image generated by an optical simulation under the same optical condition for the surface texture model specified as an estimation result of the surface texture of the non-defect sample by the surface texture estimation step and a defect model matched to input information from a user.

* * * * *